US008677063B2

(12) United States Patent
Becker-Szendy et al.

(10) Patent No.: US 8,677,063 B2
(45) Date of Patent: Mar. 18, 2014

(54) PARITY DECLUSTERED STORAGE DEVICE ARRAY WITH PARTITION GROUPS

(75) Inventors: Ralph A Becker-Szendy, San Jose, CA (US); Veera Deenadhayalan, San Jose, CA (US); D. Scott Guthridge, San Jose, CA (US); James Christopher Wyllie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 12/847,798

(22) Filed: Jul. 30, 2010

(65) Prior Publication Data

US 2012/0030425 A1     Feb. 2, 2012

(51) Int. Cl.
*G06F 12/00* (2006.01)
(52) U.S. Cl.
USPC .... 711/114; 711/170; 711/202; 711/E12.016; 711/E12.065
(58) Field of Classification Search
USPC .......... 711/114, 112, 154, 156, 170, E12.008, 711/202, 203, E12.016, E12.065
See application file for complete search history.

(56) References Cited

U.S. PATENT DOCUMENTS

| 6,412,054 | B1 | 6/2002 | Bhatia et al. |
| 6,851,082 | B1 | 2/2005 | Corbett |
| 7,346,831 | B1 | 3/2008 | Corbett |
| 7,627,715 | B1 | 12/2009 | Corbett |
| 7,694,072 | B2 * | 4/2010 | Nehse ........................... 711/114 |
| 7,702,850 | B2 * | 4/2010 | Ludwig et al. ................ 711/114 |
| 2012/0239855 | A1 * | 9/2012 | Tootoonchian et al. ...... 711/103 |

OTHER PUBLICATIONS

Mark Holland et al., "Parity Declustering for Continuous Operation in Redundant Disk Arrays", Proceedings of the 5th Conf. on Arch. Support for Prog. Languages and Operating Systems, 1992, pp. 23-35.
Guillermo A. Alvarez et al., "Tolerating Multiple Failures in RAID Architectures with Optimal Storage and Uniform Declustering", ISCA '97, SIGARCH Computer Architecture News, vol. 25, No. 2, May 1997, pp. 62-72.
Eric J. Schwabe et al., "Efficient data mappings for parity-declustered data layouts", Theoretical Computer Science, vol. 325, No. 3, Oct. 2004, pp. 391-407.
Richard R. Muntz et al., "Performance Analysis of Disk Arrays Under Failure", Proceedings of the 16th VLDB Conference, Brisbane, Australia, 1990, pp. 162-173.

(Continued)

*Primary Examiner* — Pierre-Michel Bataille
(74) *Attorney, Agent, or Firm* — Cantor Colburn LLP

(57) ABSTRACT

This disclosure relates to parity declustered storage device arrays having partition groups. In an exemplary embodiment, the storage system includes a storage device array, such as disk array. Each storage device is divided into partitions. Each partition includes stripe units, such as hundreds or thousands of stripe units in exemplary embodiments. The storage system also includes a physical array controller coupled to the storage device array. In an exemplary embodiment, the array controller includes a partition group lookup table and stores and retrieves data and parity in the storage devices based on the partition group lookup table. In this exemplary embodiment, the array controller also includes a stripe lookup table and/or a log. In an exemplary embodiment, the partition group lookup table and the stripe lookup table take up less memory (e.g., by an order of magnitude) than a single-level stripe map conveying the same information.

20 Claims, 12 Drawing Sheets

(56) References Cited

OTHER PUBLICATIONS

Eric J. Schwabe et al., "Improved Parity-Declustered Layouts for Disk Arrays", Proceedings of the 6th annual ACM symposium on Parallel algorithms and architectures (SPAA '94), Cape May, New Jersey, United States, 1994, pp. 76-84.

Mark Holland, "On-Line Data Reconstruction in Redundant Disk Arrays", Thesis submitted to the Dept. of Electrical and Computer Engineering, School of Computer Science, Carnegie Mellon University, May 1994, 254 Pages.

Eric J. Schwabe et al., "Evaluating approximately balanced parity-declustered data layouts for disk arrays", Parallel Computing, vol. 23, 1997, pp. 501-523.

Guillermo A. Alvarez et al., "Declustered Disk Array Architectures with Optimal and Near-optimal Parallelism", Proceedings of the 25th Annual ACM/IEEE International Symposium on Computer Architecture (ISCA'98), Barcelona, Spain, Jun. 1998, 25 Pages.

Larry Stockmeyer, "Parallelism in Parity-Declustered Layouts", IBM Research Report, RJ 9915, Nov. 10, 1994, 26 Pages.

"Can Declustering Save RAID Storage Technology?", May 20, 2010, located on the web at: www.enterprisestorageforum.com//article.php/3883346, 3 Pages.

Siu-Cheung Chau et al., "A Gracefully Degradable Declustered RAID Architecture with near Optimal Maximal Read and Write Parallelism", Proceedings of Second IEEE Int. Conference on Cluster Computing (Cluster '00), 2000, pp. 309-318.

Thomas J.E. Schwarz et al., "Almost Complete Address Translation (ACATS) Disk Array Declustering", Proceedings of the Eighth IEEE Symposium on Parallel and Distributed Processing, 1996, pp. 324-331.

* cited by examiner

FIG. 1 (*Prior Art*) *RAID 5 Configuration*
*C = 6, G = 6*

FIG. 2 (*Prior Art*)

Single-Level Stripe Map

| Logical Stripe | Physical Disk: Physical Stripe |
|---|---|
| : | : |
| 101 | 0:21, 2:21, 3:22 |
| 102 | 4:21, 2:22, 1:21 |
| 103 | 0:23, 4:22, 1:22 |
| 104 | 2:23, 3:23, 4:23 |
| : | : |

FIG. 3 *(Prior Art) Declustered Parity Layout*
*C = 5, G = 4*

PARITY DECLUSTERED STORAGE DEVICE ARRAY WITH PARTITION GROUPS

STATEMENT REGARDING FEDERALLY SPONSORED RESEARCH OR DEVELOPMENT

This invention was made with United States Government support under Agreement No. HR0011-07-9-0002 awarded by DARPA. The Government has certain rights in the invention.

FIELD OF THE INVENTION

The present disclosure relates to storage systems, and more specifically, parity declustered storage device arrays, such as a parity declustered redundant disk array, with partition groups.

BACKGROUND

Redundant Array of Independent (or Inexpensive) Disks (RAID) is contemporarily used as an umbrella term for computer data storage configurations that divide user data and redundancy information among multiple hard disk drives in a disk array. Redundancy information enables the reconstruction of contents of a failed disk, with or without taking the storage system offline. Redundancy information may be, for example, a mirror copy of the user data (e.g., in RAID 1) or parity (e.g., in RAID 5).

Mirroring can be prohibitively costly in some scenarios since both the data and its duplicate are stored, thereby calling for twice the storage capacity. Stated another way, a mirroring configuration incurs a storage capacity overhead for redundancy of at least 100%. To provide a system that incurs a lower storage capacity overhead for redundancy, parity is sometimes implemented instead.

In traditional RAID (i.e., RAID without parity declustering), when a disk in the disk array fails, all (or nearly all, for traditional RAID 6) of the surviving disks in the array are read during a reconstruction/recovery of a single failed disk. If the system is not or cannot be taken offline during reconstruction, user throughput during that time is reduced, and the surviving disks bear an additional load being read to reconstruct the failed disk's content. The additional load on the surviving disks during an on-line recovery may slow down the recovery and thereby increase the time needed to perform reconstruction of the failed disk's content.

BRIEF SUMMARY

Embodiments of this disclosure provide a method of storing data in a parity declustered redundant storage device array. The method may include partitioning each storage device of a redundant storage device array into partitions, wherein each partition includes a plurality of stripe units, wherein each stripe unit stores data or parity; grouping the partitions into partition groups, wherein each partition group includes G partitions located on G storage devices of the array; for each partition group, grouping stripe units of a partition group into a plurality of physical stripes, wherein each physical stripe includes G stripe units, each of the G stripe units located on a different storage device of the G storage devices associated with the partition group; constructing a partition group lookup table, wherein the partition group lookup table includes an entry for each partition group and G tuples associated with each entry, wherein each of the G tuples identifies a storage device number of a storage device in the array and a partition number of a partition within the storage device; correlating stripes of a logical disk with the physical stripes; constructing a stripe lookup table, wherein the stripe lookup table includes an entry for each stripe of the logical disk and one tuple associated with each entry, wherein the one tuple identifies a partition group number and a physical stripe number; and storing, based on the stripes of the logical disk, data and parity on storage devices of the array using the stripe lookup table and the partition group lookup table. Grouping stripe units of a partition group into a plurality of physical stripes may include grouping stripe units of a partition group into a plurality of physical stripes, wherein each physical stripe includes G stripe units, each of the G stripe units located at identical offsets on a different storage device of the G storage devices associated with the partition group. Constructing a partition group lookup table may include constructing a partition group lookup table having a memory size (e.g., in megabytes) that is at least one order of magnitude smaller than a memory size of the stripe lookup table.

Embodiments also provide a storage system including an array of storage devices, wherein each storage device includes a plurality of stripe units; and a physical array controller coupled to the array of storage devices, wherein the array controller includes a multi-level lookup table, the array controller configured to store and retrieve data and parity in the storage devices based on a data layout defined by the multi-level lookup table. Each storage device may have a storage capacity of 1 TiB (tebibyte or $2^{40}$ bytes), for example. Each storage device includes partitions. Each partition may include hundreds or thousands of stripe units, for example. Partitions from different storage devices are grouped to form partition groups. An array may include hundreds or thousands of partition groups, for example.

Embodiments further provide a multi-level lookup data structure identifying a physical location of data stored in a disk array. The multi-level lookup data structure may include a partition group lookup table located within an array controller coupled to a parity declustered redundant disk array; and a stripe lookup table located within the array controller. The partition group lookup table may include an entry for each partition group of the disk array and G tuples associated with each entry, wherein each of the G tuples identifies a disk number of a disk in the disk array and a partition number of a partition within the disk. The stripe lookup table may include an entry for each stripe of a logical disk and one tuple associated with each entry, wherein the one tuple identifies a partition group number and a physical stripe number.

Embodiments further provide a storage system including an array of storage devices, wherein each storage device is divided into a plurality of partitions, wherein each partition includes a plurality of stripe units; and a physical array controller coupled to the array of storage devices, wherein the array controller includes a partition group lookup table, the array controller configured to store and retrieve data and parity in the storage devices based on the partition group lookup table. The storage system may include a log device located within the array controller. The array controller may be configured to use the log device to perform atomic updates of data and parity associated with a logical stripe to a physical stripe storing existing data and parity associated with that logical stripe. The storage system may include a stripe lookup table located within the array controller. The stripe lookup table including an entry for each stripe of a logical disk and one tuple associated with each entry, wherein the one tuple identifies a partition group number and a physical stripe number.

DETAILED DESCRIPTION

Figure 1:
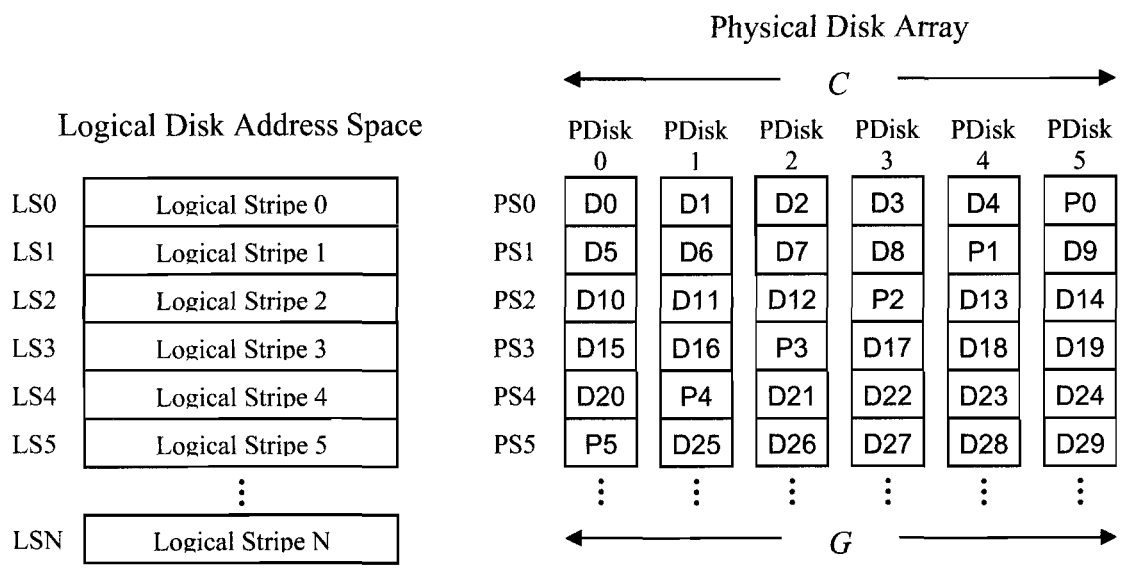
FIG. 1 is an illustration representative of a disk array implementing parity redundancy information in a traditional RAID 5 configuration.

Embodiments of this disclosure relate generally to storage systems, and more specifically, parity declustered storage device arrays, such as a parity declustered redundant disk array, with partition groups. Today, high performance, fault-tolerant data storage systems (preferably in continuous operation) are in demand. To provide this, a storage system may include a storage device array, such as a disk array. A disk array is a set of physical disks with redundancy to protect against data lost. Embodiments of this disclosure provide a data layout for a disk array based on a partition group lookup table. A data layout is an arrangement of data and redundant information (such as parity) that allows the array to reconstruct the contents of one or more failed disks, thereby providing a level of fault tolerance. A data layout is constructed by partitioning units of the disk array into a collection of non-overlapping stripes.

This disclosure describes a novel mechanism for partitioning units of a disk array into a collection of non-overlapping stripes. In embodiments of this disclosure, each storage device of a redundant storage device array is partitioned into partitions. Each partition includes a plurality of stripe units. In one exemplary embodiment, each partition includes at least 1000 stripe units. The partitions are grouped into partition groups. Each partition group includes G partitions that are located on G different storage devices of the array. G is the number of units in a parity stripe, including the parity unit(s). Accordingly, as an example, if a storage system is configured to have 11 units in a parity stripe, each partition group will include 11 partitions, and each of those partitions will be located on a different storage device. For each partition group, stripe units on different partitions of the partition group are grouped to form a physical stripe, thereby forming a plurality of such physical stripes. Each physical stripe includes G stripe units. Each of the G stripe units is located on a different storage device of the G storage devices associated with that partition group. As discussed in more detail below, in parity declustered storage device arrays, G will be less than C, the number of storage devices in the storage device array. As further explained below, by using a value of G that is $2 \leq G < C$, rather than G=C as in traditional RAID 5 configurations, parity declustering can allow for the balancing of storage equipment cost against data reliability and performance during failure recovery. Compared to storage device arrays without parity declustering (e.g., traditional RAID arrays), storage device arrays with parity declustering (e.g., declustered RAID arrays) may reduce the load on surviving disks during a reconstruction of a failed disk's content, and in some circumstances, yield higher user throughput during recovery and/or reduce the time required to reconstruct contents of a failed disk in an on-line disk array.

In embodiments of this disclosure, data and parity are stored and retrieved from the storage devices in the array based on a partition group lookup table. A lookup table is a data structure, such as an array or associative array, often used to replace a runtime computation with a simpler array indexing operation. Generally, a lookup table provides flexibility of data placement, which tends to allow a system to more easily maintain balance of the amount of data allocated on each physical storage device within a storage device array when the size of the device array is changed, e.g., due to adding/removing disks, including temporarily due to a disk failure or less temporarily in the event of a structural change to the storage system setup. In some circumstances, a lookup table may save processing time, since retrieving a value from memory can be faster than undergoing complex computations or complex input/output operations. In one exemplary embodiment, a stripe lookup table is also provided such that the partition group lookup table and the stripe lookup table together form a multi-level lookup table. For certain disk arrays, this multi-level lookup tables takes up significantly less memory compared to a single-level stripe map that directly maps logical stripe units to physical disk stripe units. In certain embodiments, the multi-level lookup table takes up an order of magnitude less memory compared to a single-level stripe map conveying the same information (e.g., 141 MiB compared 1.5 GiB), as described in more detail below.

INTRODUCTION

Although a disk array is a set of physical disks, in practice, a disk array often appears to, and is treated by, a host machine and/or clients coupled to the disk array as if the disk array were one or more logical disks. In implementations where the disk array appears as more than one logical disk, the multiple logical disks may be referred to as a logical array. The logical disk(s) are associated with a linear virtual address space. When a host or client issues a READ or WRITE to a particular virtual address in this linear virtual address space, the disk array controller uses the virtual address to determine the corresponding physical address, the disks and offsets on the various disks in the disk array. For example, while a client may issue a READ request for data that the client believes is sequentially located (e.g., because the linear virtual addresses that are sequential), the actual physical location of the data may be spread apart on multiple disks in the array. Thus, a disk array can provide increased input/output (I/O) throughput rates to large data sets by allowing parallel access to the disks in the array. Redundancy is used to achieve a level of fault tolerance, since each disk in the array may fail independently with some probability in a period of time, and therefore the probability that some disk in a large array will fail in a period of time may become significant.

A data stripe unit, or data unit, is the minimum amount of contiguous data allocated to one disk before any data is allocated to any other disk. A parity stripe unit, or parity unit, is a block of parity information that is the size of a data unit. A parity stripe is the set of data units over which one or more parity units are computed, plus those parity unit(s) itself/themselves. The size of a parity stripe is configurable and may typically be from 64 KiB to 16 MiB. The number of stripes in a disk array is equal to the capacity of the array divided by the stripe size. G is the number of units in a parity stripe, including the parity unit(s). C is the number of physical disks in a disk array. As used herein, stripe unit is used, instead of data unit or parity unit, when the distinction between data and parity is not pertinent to the example at hand. In examples provided herein, the stripe units are on the order of kilobytes in size. However, it shall be appreciated that in other exemplary embodiments, a stripe unit may be on the order of bits, bytes, or megabytes. In practice, stripe units in accordance with embodiments of this invention are often, but not necessarily, dozens of kilobytes to megabytes in size (e.g., 16 KB to 2 MB, for example).

When a disk in a disk array fails, the fraction of each surviving disk that is read during the reconstruction of a failed disk is referred to as the declustering ratio, $\alpha$. The declustering ratio is computed by calculating $(G-1)/(C-1)$. In a traditional RAID system (e.g., a RAID 5 system), the number of units in a parity stripe is equal to the number of physical disks in the disk array, i.e., $G=C$.

FIG. 1 is an illustration representative of a disk array implementing parity redundancy information in a traditional RAID 5 configuration. As depicted on the left of FIG. 1, the logical disk address space is divided into logical stripes (e.g., Logical Stripe 0 through Logical Stripe N) up to the capacity of the logical disk. As seen on the right of FIG. 1, only the first few units on each physical disk are shown, "D" blocks represent blocks of user data (of unspecified size, but some multiple of one sector on a disk), and "P" blocks represent a parity block over the "D" blocks in that same parity stripe. In FIG. 1, the number of units in a parity stripe (e.g., PS0) is equal to the number of disks in the array (i.e., G=6 and C=6). Accordingly, the declustering ratio for the RAID 5 configuration shown is one ($\alpha=1$), which means that all the surviving disks are read during the reconstruction of a single failed disk. For example, if PDisk 3 fails, then D0 on PDisk 0, D1 on PDisk 1, D2 on PDisk 2, D4 on PDisk 4, and P0 on PDisk 5 are read to reconstruct D3 on PDisk 3, and so on. Stated another way, traditional RAID configurations do not decluster parity information.

Parity declustering is a method for arranging data and parity information in a storage device array (e.g., a disk array), in which the number of units in the parity stripe is smaller than the number of storage devices in the storage device array (i.e., G<C). Accordingly, in a parity declustered redundant disk array, sometimes referred to as declustered RAID, data and parity are distributed over the disk array, with each parity stripe using only a subset of the disks. Therefore, the declustering ratio is less than one (i.e., $\alpha<1$), meaning that when a disk in the array fails, only a subset of the surviving disks are read to reconstruct any given parity stripe affected by the failed disk. This configuration tends to yield a relatively higher I/O throughput during recovery and/or a shorter recovery time.

Figure 2:
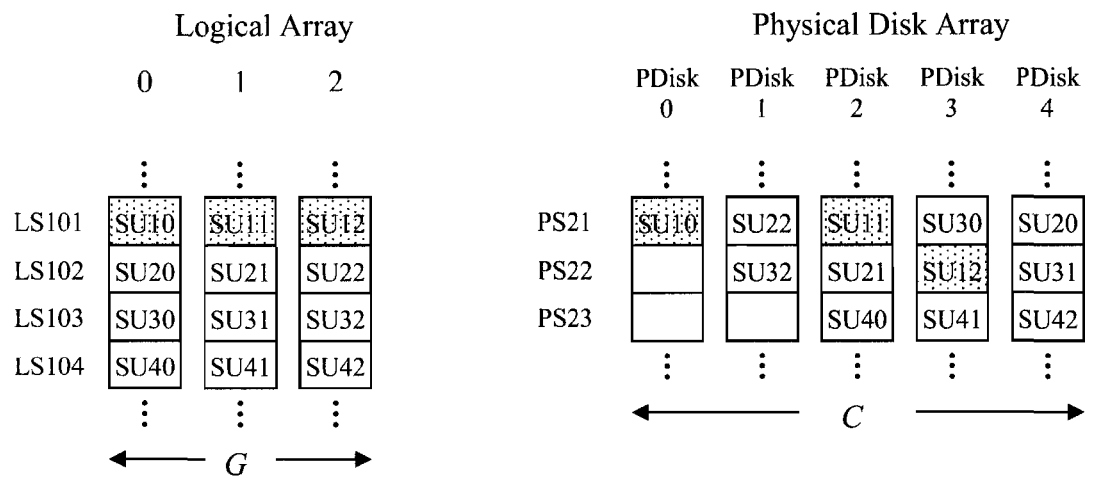
FIG. 2 is a representation of data layout defined by a prior art single-level stripe map.

To accomplish parity declustering, two mechanisms for defining data layout have been previously considered. The first mechanism for determining data layout is through use of a single-level stripe map directly mapping logical stripe units to physical disk stripe units. FIG. 2 is a representation of data layout defined by a prior art single-level stripe map. In FIG. 2, the single-level stripe map 200 is organized so that each row corresponds to a logical stripe (e.g., 101). Each logical stripe has a corresponding set of numbers. So for example, logical stripe 101 (LS101) is associated with the following set of numbers 0:21, 2:21, 3:22. Each number before a colon identifies a physical disk, and each number after the colon identifies a physical stripe. So, for logical stripe 101 (LS101), the first stripe unit (i.e., SU10) is located on physical disk 0 (i.e., PDisk 0) on physical stripe 21 (i.e., PS21). For logical stripe 101, the second stripe unit (i.e., SU11) is located on physical disk 2 (i.e., PDisk 2) and also on physical stripe 21 (i.e., PS21). The third stripe unit (i.e., SU12) is located on physical disk 3 (i.e., PDisk 3) but on physical stripe 22 (i.e., PS22). The prior art single-level stripe map mechanism has the potential to be memory intensive for larger disk arrays.

Figure 3:
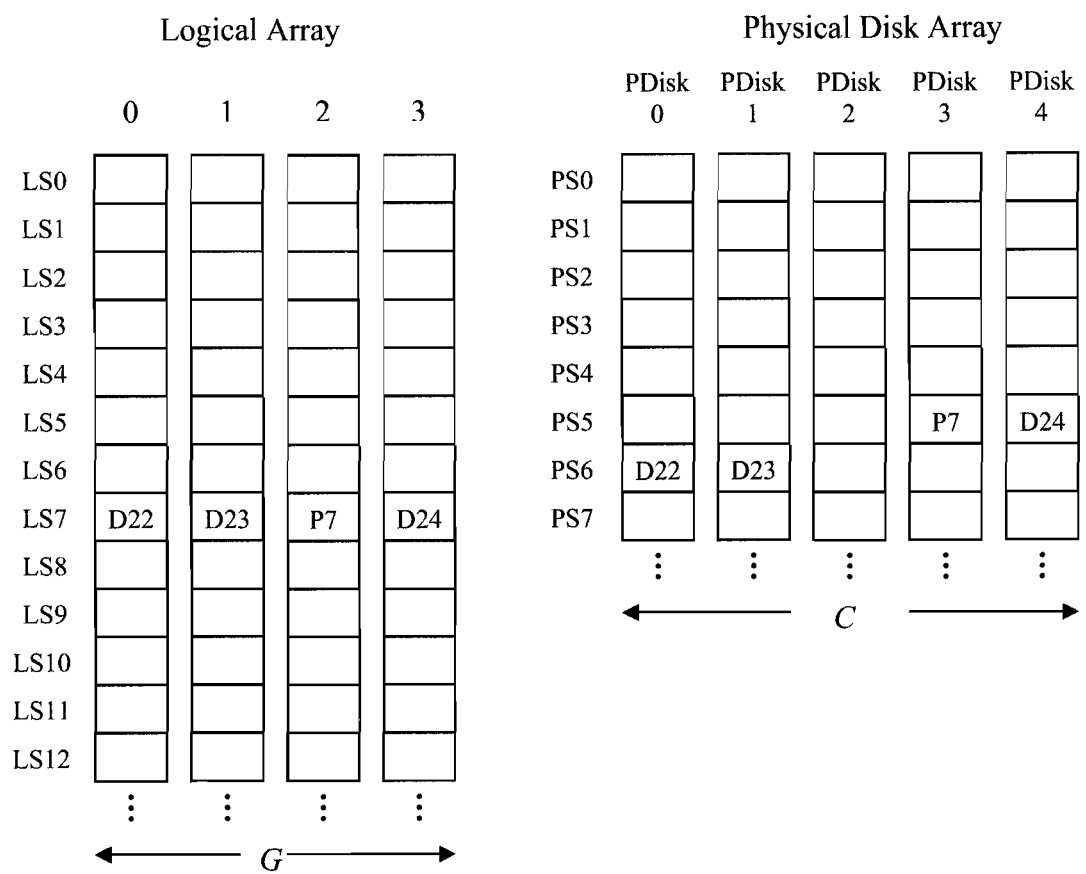
FIG. 3 is an illustration showing a prior art parity declustered layout based on a complete block design.

The second previously considered mechanism for determining data layout is to determine data layout completely algorithmically. Investigations using this mechanism include defining data layouts based on a complete block design, balanced incomplete block design (BIBD), or other algorithmic designs. FIG. 3 is an illustration showing a prior art parity declustered layout based on a complete block design. Similar to FIG. 1, in FIG. 3, only the first few units on each disk are shown, "D" blocks represent blocks of user data (of unspecified size, but some multiple of one sector on a disk), and "P" blocks represent a parity block over the "D" blocks in that same logical stripe (LS). As seen in FIG. 3, stripe units of the same logical stripe in FIG. 3 may not be located within the same physical parity stripe (PS) in the disk array. Unlike in a lookup table based layout, however, the physical location of a particular stripe unit is predetermined by the algorithm on which the layout is based. The particular complete block design algorithm shown in FIG. 3 is discussed in Mark Holland and Garth Gibson's article "*Parity Declustering for Continuous Operation in Redundant Disk Arrays,*" published in the Proceedings of the 5th Conference on Architectural Support for Programming Languages and Operating System, 1992. Because the physical location of a particular stripe unit is predetermined by the algorithm in parity declustered disk arrays that implement an algorithm-based data layout, such configurations do not support shadowing. Shadowing is a technique used by file systems to ensure atomic update to persistent data-structures.

EXEMPLARY EMBODIMENTS

Various embodiments of this disclosure are now described in terms of the following exemplary storage systems. It shall be appreciated that many modifications to and variations upon particular exemplary embodiments discussed below may be made without departing from the scope and spirit of this disclosure. These embodiments were chosen and described in order to best explain the principles of this disclosure and the practical application, and to enable others of ordinary skill in the art to understand this disclosure for various embodiments with various modifications as are suited to the particular use contemplated.

Figure 4:
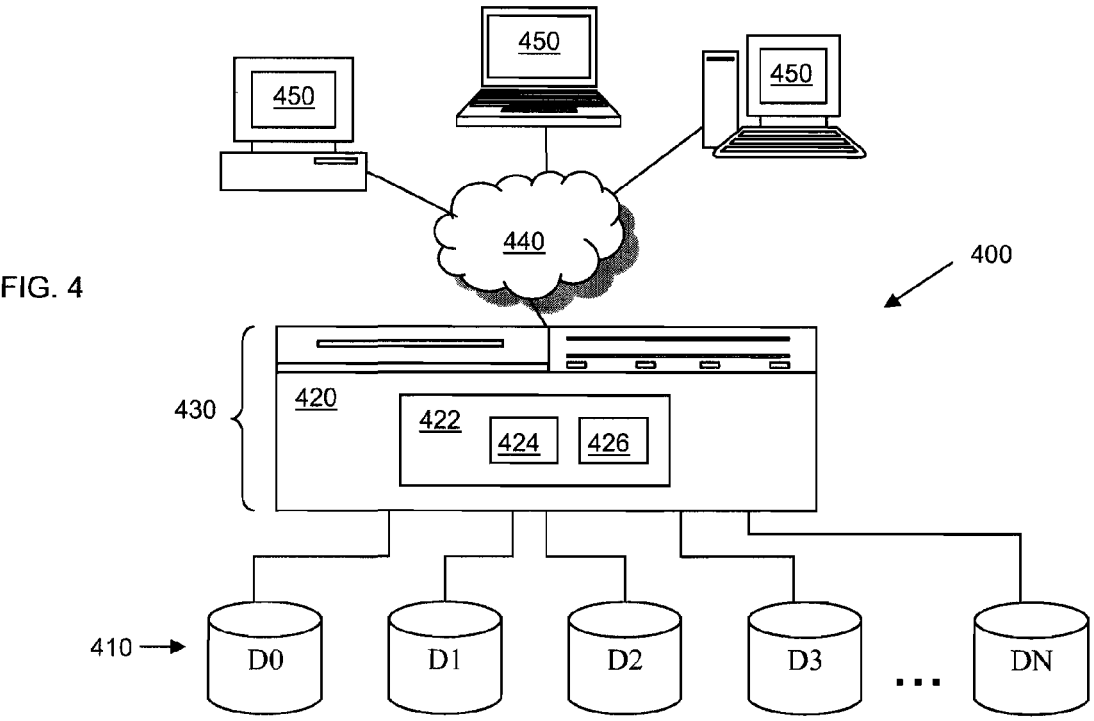
FIG. 4 is an illustration of a system in accordance with embodiments of this disclosure.

FIG. 4 is an illustration of a system 400 in accordance with embodiments of this disclosure. The system 400 includes an array 410 of storage devices (D0-DN) and an array controller 420. The array controller 420 includes a multi-level lookup table 422. The multi-level lookup table 422 includes a partition group lookup table 424 and a stripe lookup table 426. In FIG. 4, the array controller is part of a host machine 430. The system 400 further includes a network 440 and clients 450. The storage device array 410 is coupled to the array controller 420 (in the host machine). The host machine 430 is coupled to the clients 450 via the network 440.

The storage device array 410 may be a hard disk array, for example. In one embodiment, one or all of the storage devices in the array 410 have a storage capacity of at least 1 terabyte. In other embodiments, storage devices in the array have more or less a storage capacity. For example, in some embodiments, each storage device in the array has the same storage capacity that may be approximately 100 GB to approximately 10 TB.

Each storage device (e.g., D0) is partitioned into a plurality of partitions. Each partition has a plurality of stripe units, and each stripe unit may store either data or parity. In one embodiment, each partition includes at least one thousand stripe units. Thus, each storage device includes a plurality of stripe units, which may be thousands of stripe units. The partitions from different storage devices form a partition group. Each partition group is divided into physical parity stripes (or physical stripes). The physical stripes correlate (or map) to stripes of a logical disk, as further described below. In FIG. 4, the storage device array 410 is a parity declustered storage device array, such as a parity declustered redundant disk array. Accordingly, G, the number of units in a parity stripe, is less than C, the number of storage devices in the storage array. Since in FIG. 4, the storage device array 410 has N+1 storage devices, G is between 2 and N, inclusive, (i.e., $2 \leq G \leq N$). Accordingly, each parity stripe uses only a subset of the devices in the array. Data is stored in data stripe units (or data units) of the storage devices D0-DN. Parity is stored in parity stripe units (or parity units) of the storage devices D0-DN. The data units and parity unit(s) of a particular stripe are stored on different devices of the array. For example, for a particular stripe, data units may be stored on D0, D1 and D2 and the parity unit may be stored on DN.

The array controller 420 may be hardware, software (including firmware, resident software, micro-code, etc.) or combination of both hardware and software. As used herein, the term physical array controller is used when the array controller is hardware or a combination of hardware and software. The array controller 420 is configured to store (e.g., for WRITE commands) and retrieve (e.g., for READ commands) data and parity in the storage devices 410 based on a data layout defined by the multi-level lookup table 422. The multi-level lookup table 422 may hardware, software (including firmware, resident software, micro-code, etc.) or combination of both hardware and software. In an exemplary embodiment, the multi-level lookup table 422 is stored on a computer readable medium, such as a computer readable storage medium. In one embodiment, the multi-level lookup table 422 has a memory size in an order of magnitude of megabytes. In other embodiments, the multi-level lookup table 422 has a smaller size, e.g., in an order of magnitude of kilobytes.

The array controller 420 maps a virtual address space to the corresponding physical address, the devices and offsets on the various devices (e.g., disks) in the array 410. So, for example, in use, when the host machine 430 or a client 450 issues a READ or WRITE command to a particular virtual address in the linear virtual address space, the array controller 420 uses the virtual address to determine the corresponding physical address, the disks and offsets on the various storage devices D0-DN in the storage device array 410 based on the data layout defined by the multi-level lookup table 422.

The partition group lookup table 424 has an entry for each partition group and G tuples associated with each entry. Accordingly, the number of entries in table 424 is equal to the number of partition groups of the array. Each of the G tuples identifies a storage device number of a storage device in the array 410 and a partition number of a partition within that storage device.

The stripe lookup table 426 has an entry for each stripe of the logical disk and one tuple associated with each entry. The one tuple identifies a partition group number and a physical stripe number. Accordingly, the number of entries in table 426 is equal to the number of logical stripes for the array. The number of logical stripes for an array may or may not equal the number of physical stripes of the array. In certain embodiments, the number of physical stripes may be greater than the number of logical stripes to allow for unconfigured space or for shadowing operations, for example.

The network 440 couples server-side devices to client-side devices. For example, in FIG. 4, the network 440 couples the host machine 430 to each of the clients 450. The network 440 may be, for example, any type of network, including a local area network (LAN), a wide area network (WAN), storage area network (SAN), or a message passing interface (MPI). The client 450 may be any of a variety of now known or future known devices that access the host machine 430 or 530. For example, the client 450 may be a desktop computer, a workstation, a laptop, a VoIP telephone, a mobile phone, etc.

Figure 5:
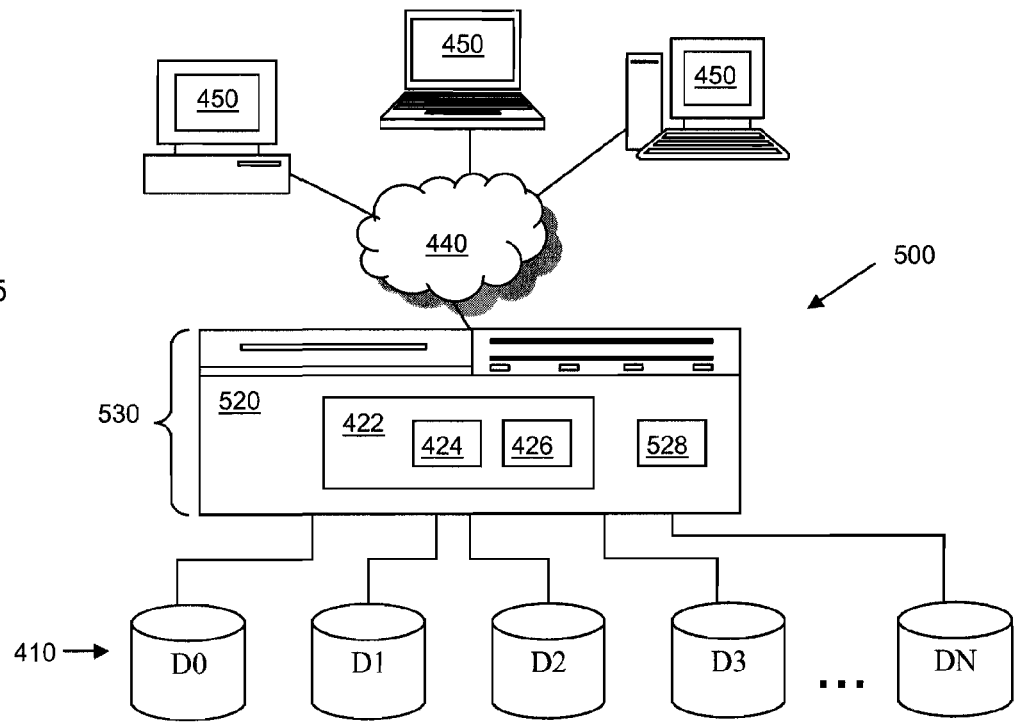
FIG. 5 is an illustration of a system in accordance with embodiments of this disclosure.

FIG. 5 is an illustration of a system 500 in accordance with embodiments of this disclosure. The system 500 includes an array 410 of storage devices (D0-DN) and an array controller 520. The array controller 520 includes a multi-level lookup table 422, which includes a partition group lookup table 424 and a stripe lookup table 426. The array controller 520 also includes a log 528. The array controller is part of a host machine 530. The system 500 further includes a network 440 and clients 450. The storage device array 410 is coupled to the array controller 520 (in the host machine). The host machine 530 is coupled to the clients 450 via the network 440.

Figure 6:
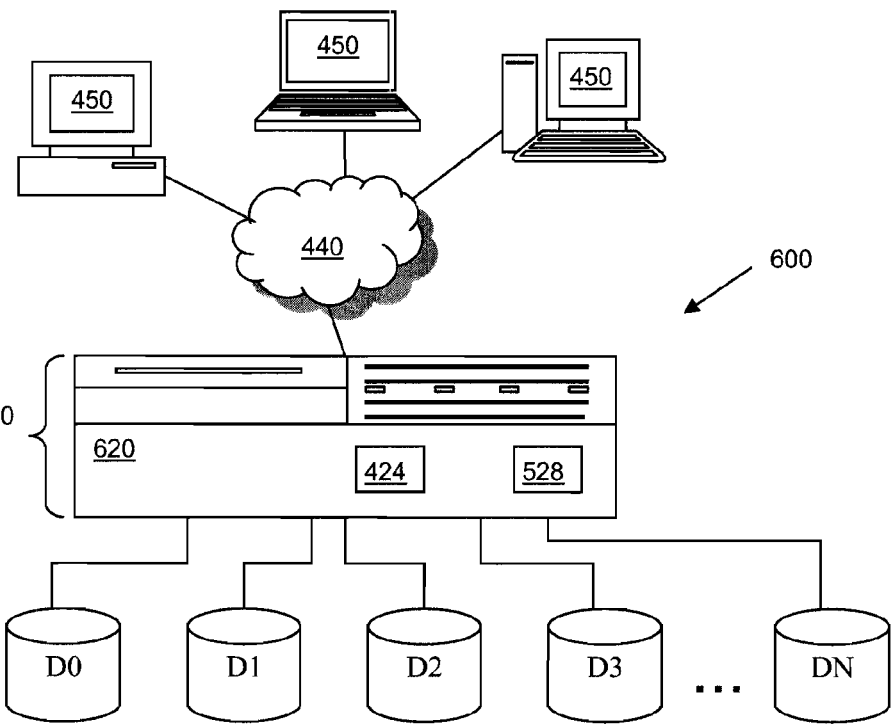
FIG. 6 is an illustration of a system in accordance with embodiments of this disclosure.

FIG. 6 is an illustration of a system 600 in accordance with embodiments of this disclosure. The system 600 includes an array 410 of storage devices (D0-DN) and an array controller 620. The array controller 620 includes a partition group lookup table 424 and a log 528. The array controller 620 is part of a host machine 630. The system 600 further includes a network 440 and clients 450. The storage device array 410 is coupled to the array controller 620 (in the host machine). The host machine 630 is coupled to the clients 450 via the network 440. The array controller 620 is configured to store (e.g., for WRITE commands) and retrieve (e.g., for READ commands) data and parity in the storage devices 410 based on the partition group lookup table 424.

Figure 7:
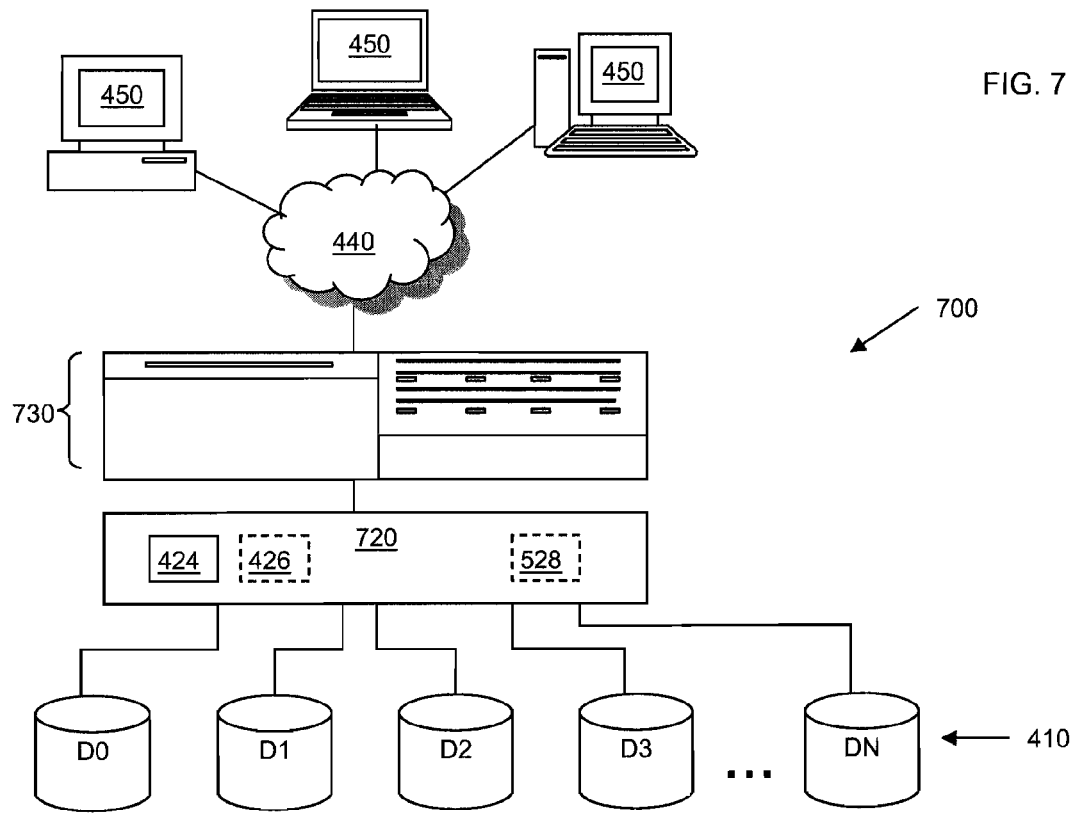
FIG. 7 is an illustration of a system in accordance with embodiments of this disclosure.

FIG. 7 is an illustration of a system 700 in accordance with embodiments of this disclosure. The system 700 includes an array 410 of storage devices (D0-DN) and an array controller 720. The array controller 720 includes a partition group lookup table 424, and a stripe lookup table 426 and/or a log 528. The system 700 further includes a host machine 730, a network 440, and clients 450. In FIG. 5, the array 410 is coupled to the array controller 720. The array controller 720 is coupled to the host machine 730. The host machine 730 is coupled to the clients 450 via the network 440. In other embodiments (not shown), the system (e.g., 700), may have a plurality of array controllers coupled to the host machine, with one or more one or more storage devices coupled to each of the plurality of array controllers.

In embodiments in which the array controller includes a partition group table 424 and a stripe lookup table 426 (e.g., array controllers 420 and 520, and possibly 720), shadowing is supported, as described in more detail below.

In other embodiments (not depicted), a log device (e.g., log 528) may be located outside of the array controller. For example, in one embodiment not shown, the log 528 for a first disk array (which may be referred to as, for example, Disk Array A) is placed on a logical disk associated with a different, independent, disk array (which may be referred to as, for example, Disk Array B). Disk Array B may or may not have a log device for data stored on its disks.

Figure 8:
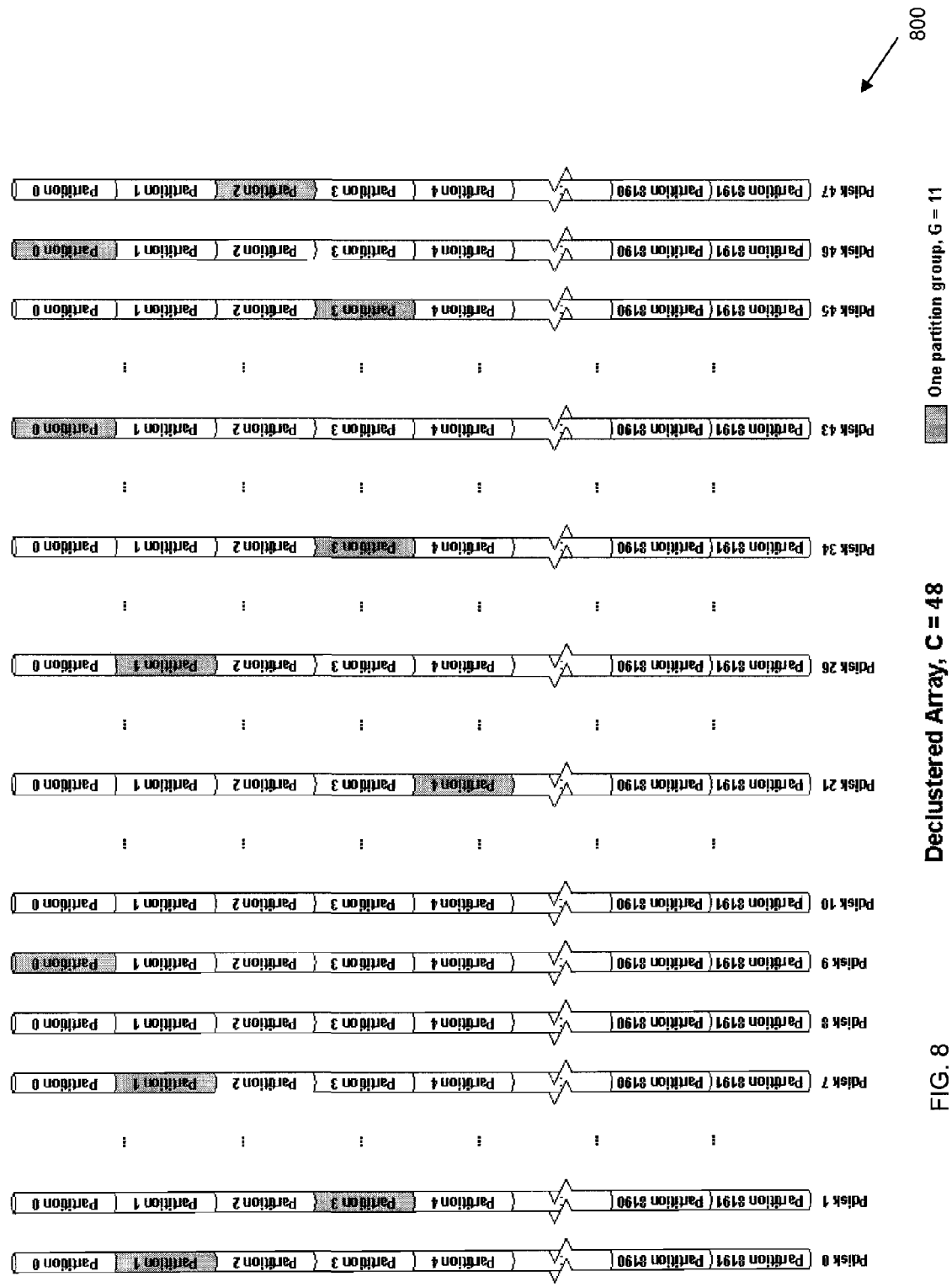
FIG. 8 is a diagram of disks in a disk array partitioned in accordance with one exemplary embodiment of this disclosure.

To provide reference for further understanding of embodiments of this disclosure, FIG. 8 is a diagram of disks in a disk array 800 partitioned in accordance with one exemplary embodiment of this disclosure. The array 410 may be the disk array 800, for example, in which case DN in the storage device array 410 corresponds to Pdisk 47 in disk array 800. In FIG. 8, the array 800 includes 48 disk, and each disk is divided into 8192 partitions. Each partition includes a plurality of stripe units (e.g., tens, hundreds or thousands of stripe units). The partitions of the disk array are grouped into partition groups. Each partition group includes G partitions located on different disks of the array. In the embodiment shown in FIG. 8, the system is configured as G=11. So, as an example, one partition group is highlighted in FIG. 8 by shading. The 11 partitions in that partition group are Partition 1 of Pdisk 0, Partition 3 of Pdisk 1, Partition 1 of Pdisk 7, Partition 0 of Pdisk 9, Partition 4 of Pdisk 21, Partition 1 of Pdisk 26, Partition 3 of Pdisk 34, Partition 0 of Pdisk 43, Partition 3 of Pdisk 45, Partition 0 of Pdisk 46, and Partition 2 of Pdisk 47.

Figure 9:
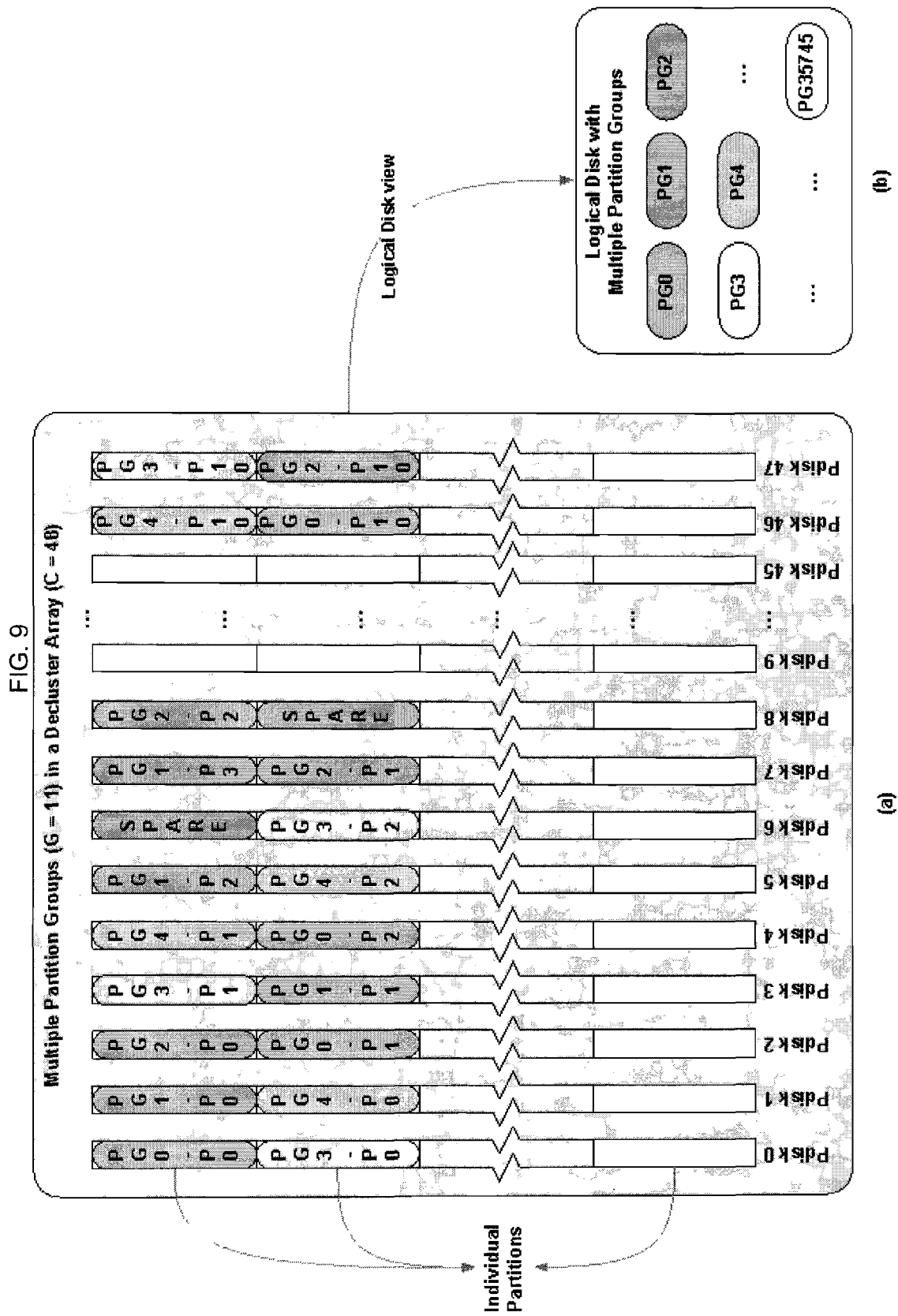
FIG. 9 is an illustration of a logical view of a parity declustered disk array highlighting multiple partition groups in accordance with embodiments of this disclosure.

FIG. 9 is an illustration of a logical view of a parity declustered disk array highlighting multiple partition groups in accordance with embodiments of this disclosure. As in FIG. 8, in the example shown in FIG. 9, each partition group has a width of 11 (i.e., each partition group spans 11 disks). As understood from FIG. 9, the partitions of a partition group may appear on any physical disk so long as for each partition group, its partitions occur on different physical disks. So for example, partition group 0 (PG0) has a first logical partition (P0) that is physically located on Pdisk0, a second logical partition (P1) that is physically on Pdisk2, a third logical partition that is physically located on Pdisk4, etc. This is further understood with reference to FIG. 10. In FIG. 9, the example array of 47 disks is divided into a total of 35746 partition groups.

Figure 10:
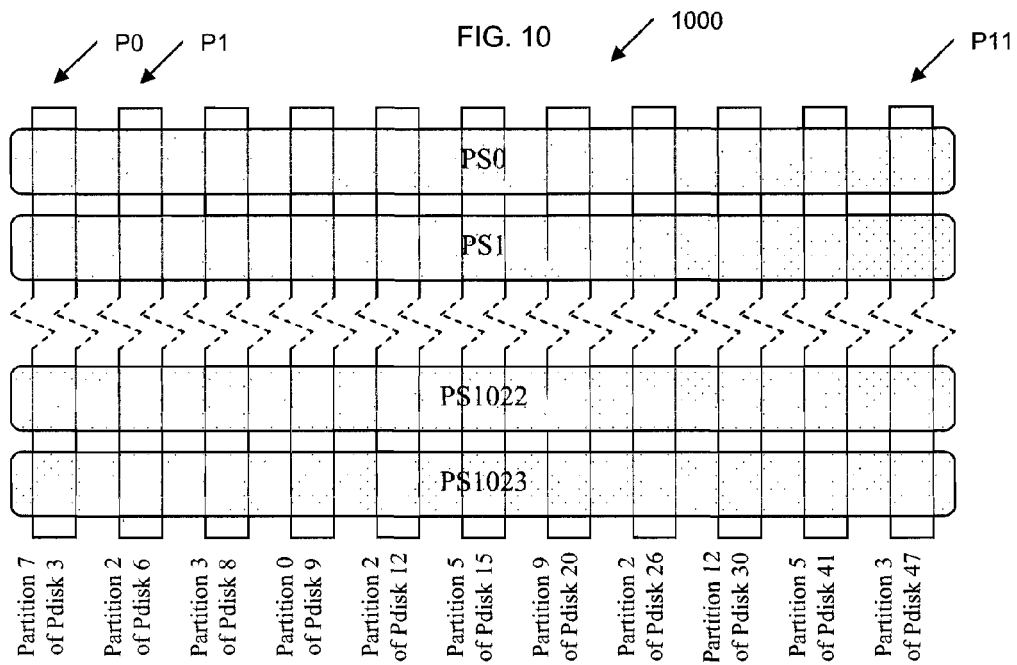
FIG. 10 is a diagram of a partition group in accordance with embodiments of this disclosure.

FIG. 10 is a diagram of a partition group 1000 in accordance with embodiments of this disclosure. As in FIGS. 8 and 9, the partition group 1000 has a width of 11. The partition group has a first logical partition P0 that is physically the seventh partition of the third disk (or Partition 7 of Pdisk 3) in the disk array (e.g., the disk array 410), a second logical partition P1 that is physically the second partition of the sixth disk of the disk array (or Partition 2 of Pdisk 6), etc. Each physical partition (e.g., Partition 7 of Pdisk 3) has a plurality of stripe units. The stripe units of the partition are grouped into a plurality of physical stripes. For example, in FIG. 10, stripe units of the partition group 1000 are grouped into physical stripe PS0-P1023. As can be seen in FIG. 10, each physical stripe (PS) includes G stripe units located on G disks of the partition group (in this case G=11). Accordingly, for an array such as the array 800, in which each 1 TiB disk ($2^{40}$ bytes, in the example) is divided into 8192 partitions of 128 MiB (1 MiB=$2^{20}$ bytes=1048576 bytes), there may be 1024× 8192×48/11 physical stripes, each providing 1 MiB of user space, and using 11×128 KiB of physical space, as an example.

Figure 11:
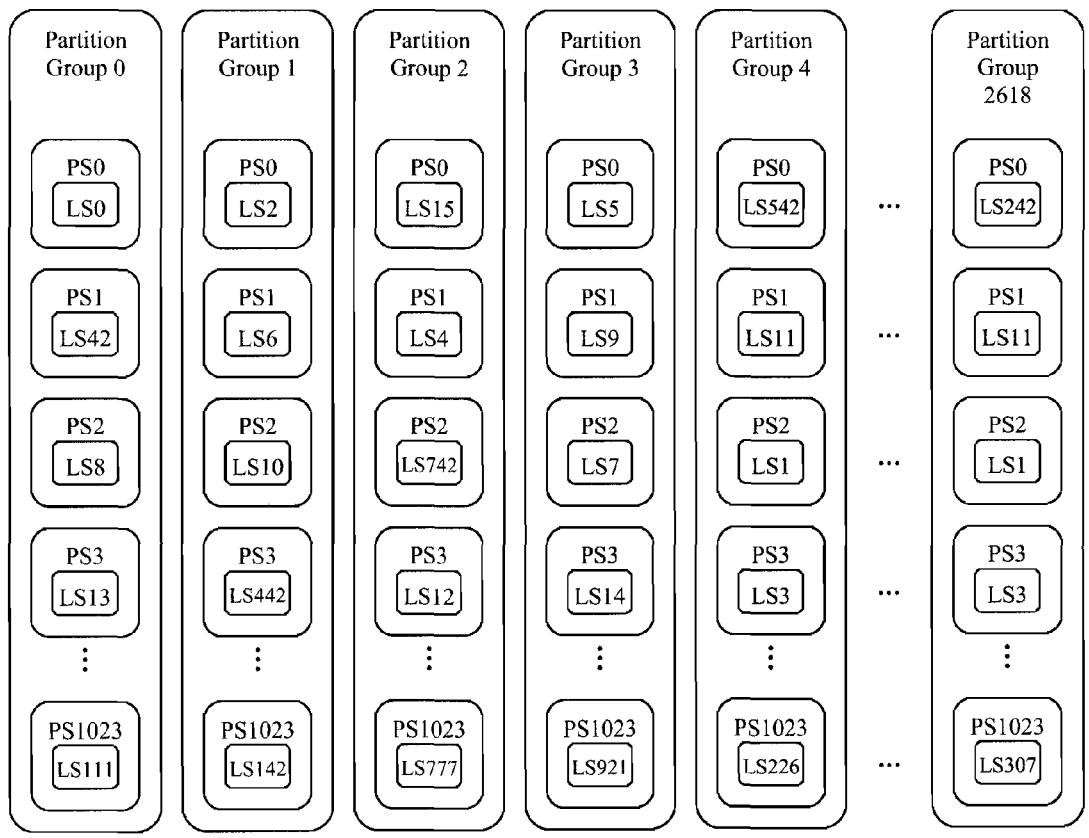
FIG. 11 is a diagram of logical stripes laid on physical stripes in accordance with embodiments of this disclosure.

FIG. 11 is a diagram of logical stripes laid on physical stripes in accordance with embodiments of this disclosure. As may be understood from FIG. 11, in certain embodiments, a storage device array, such as a disk array, may be divided into thousands of partition groups, each partition group of a similar structure as that of partition group 1000 shown in FIG. 10. Each partition group has its own sequence of physical stripes. Accordingly, it should be understood that in FIG. 11, physical stripe 0 (or PS0) in Partition Group 0 is not the same as or sequentially associated with physical stripe 0 (or PS0) of Partition Group 1. FIG. 11 also shows logical stripes that appear in two different physical locations. For example, logical stripe 11 (or LS11) appears in Partition Group 4, physical stripe 1 (or PS1) as well as in Partition Group 2618, physical stripe 1 (or PS1). This may occur when new data for logical stripe 11 is written to a new location rather than overwriting an old location. In embodiments where a stripe lookup table is implemented, the stripe lookup table (e.g., the stripe lookup table 1224 discussed below) may be updated to identify the new location. In embodiments where a log device (e.g., the log 528) is implemented, the log device may identify the new location of the logical stripe.

Figure 12:
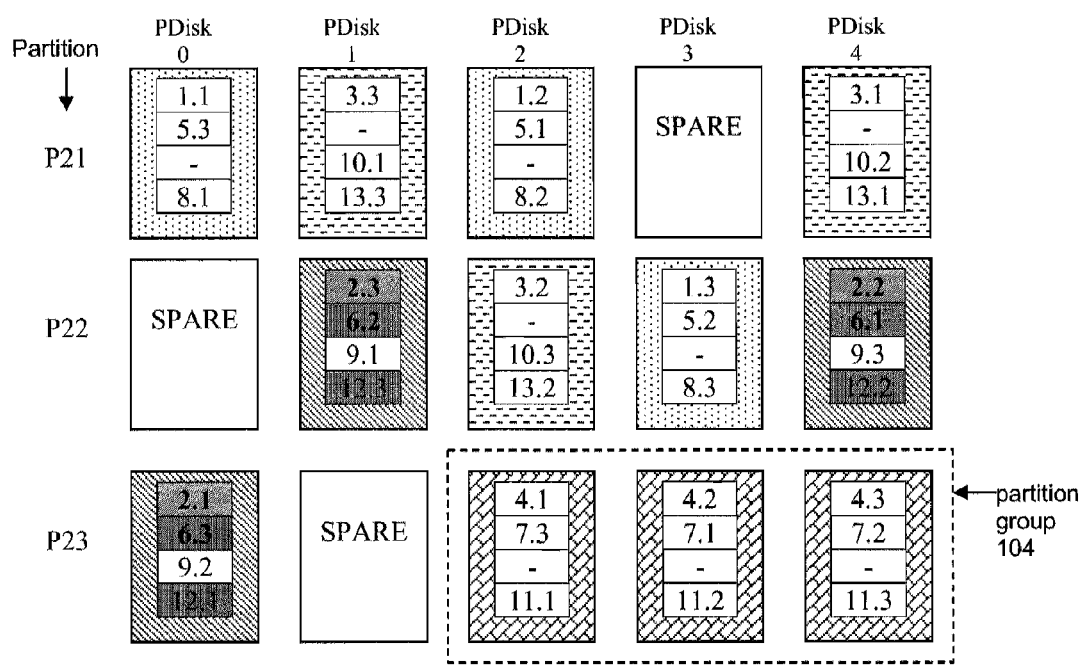
FIG. 12 is an illustration depicting a sample data layout based on a stripe lookup table and a partition group lookup table in an array controller in accordance with embodiments of this disclosure.

FIG. 12 is an illustration depicting a sample data layout based on a stripe lookup table 1226 and a partition group lookup table 1224 in an array controller 1220 in accordance with embodiments of this disclosure. The array controller 1220 is coupled to a disk array 1210 (similar to the corresponding structures in FIGS. 4-7 as applicable). In FIG. 12, the disk array 1210 stores data and parity in the data layout according to the stripe lookup table 1226 and the partition group lookup table 1224.

The stripe lookup table 1226 has an entry for each stripe of a logical disk and one tuple associated with each entry. The one tuple identifies a partition group number (referred to in FIG. 12 as "PG#") and a physical stripe number (referred to in FIG. 12 as "PS#"). For example, the stripe lookup table 1226 has an entry for stripe 2 of a logical disk. The entry for logical stripe 2 is associated with a 1-element set that is the tuple [103:0]. This tuple identifies a partition group number (e.g., "103") and a physical stripe number (e.g., "0"). Similarly, the stripe lookup table 1226 also has an entry for stripe 6 of the logical disk. The entry for logical stripe 6 is associated with a 1-element set that is the tuple [103:1]. The one tuple identifies a partition group number (e.g., "103") and a physical stripe number (e.g., "1").

The partition group lookup table 1224 has an entry for each partition group of the disk array 1210. G tuples are associated with each entry of the partition group lookup table. Each of the G tuples identifies a disk number (referred to in FIG. 12 as "PDisk#") of a disk in the disk array and a partition number (referred to in FIG. 12 as "Parition#") of a partition within that disk. For example, the partition group lookup table 1224 has an entry for partition group 103 of the disk array 1210. For simplicity of explanation, the data layout of the array 1210 uses a three stripe unit parity stripe, such that G=3, rather than G=11 as in FIGS. 8 and 11. The entry for partition group 103 is associated with the 3-tuple set [0:23], [4:22], [1:22], or 3 tuples. (For ease of understanding, partition group 103 is indicated by downward diagonal stripes in FIG. 12. Similarly for ease of understanding, in FIG. 12, other partition groups are also indicated by various similar geometric filling. For example, the partitions of partition group 104 each are filled with a brick like geometric filling.) Each element of the 3-element set is a two-element tuple (e.g., [0:23]) identifying a disk number (e.g., "0") of a disk in the disk array 1210 and a partition number (e.g., "23") of a partition within that disk.

In use, in embodiments of this disclosure, an array controller (e.g., the array controller 420, 520, 620 or 720) coupled to a storage device array stores or reads data based on stripes of a logical disk using data structure(s) such as 1224 and 1226. In this example, the array controller 1220 coupled to the data array 1210 stores and/or reads data based on stripes of the logical disk using the partition group lookup table 1224 and the stripe lookup table 1226.

Logical Stripe 2 Example:

For example, in one application, the array controller 1220 receives a request (e.g., from a client 450) to read data located at logical stripe 2. The array controller 1220 accesses the stripe lookup table 1226 stored in a memory (e.g., in or coupled to the array controller 1220) and locates the entry for logical stripe 2. The array controller retrieves the corresponding one tuple, which in this example is [103:0]. The array controller uses the first number "103" of the retrieved tuple [103:0] in reading the partition group lookup table 1224 to locate and retrieve a corresponding G-element set of tuples, here the 3-tuple set ([0:23], [4:22], [1:22]).

Based on the second number "0" of the retrieved one tuple of the stripe lookup table [103:0], the array controller locates the first stripe unit of logical stripe 2 by accessing the disk identified in the first tuple [0:23] of the 3-tuple set ([0:23], [4:22], [1:22]), and the partition of that disk identified in that first tuple [0:23] of the 3-tuple set ([0:23], [4:22], [1:22]). The array controller decides to use the first tuple by computing the physical stripe number mod G. Accordingly, in this example, the controller computes the second number "0" from the retrieved one tuple of the stripe lookup table (which is the physical stripe number) modulo 3 (which is G in FIG. 12) to obtain 0, indicating first.

In this case, the disk identified in the first tuple of the 3-tuple set [0:23] is "0", i.e., PDisk 0, and the partition of that disk identified in that first tuple [0:23] is "23", i.e., Partition 23. Similar to the discussion relating to FIG. 10, each physical partition of a physical disk in the disk array 1210 (e.g., Partition 23 of PDisk 0) has a plurality of stripe units. The array controller determines which of the plurality of stripe units of partition 23 to read as the first stripe unit of logical stripe 2, in this embodiment also based on the second number of the retrieved one tuple of the stripe lookup table. In this case, the second number of the retrieved one tuple [103:0] is "0". Therefore, the array controller reads the first physical stripe unit of partition 23 of PDisk 0 as being the first stripe unit of logical stripe 2 (since "0" would also indicate first here). In FIG. 12, this first physical stripe unit that is the first stripe unit of logical stripe 2 is labeled as "2.1" corresponding to <logical stripe #>:<logical stripe unit #> for ease of understanding).

The array controller 1220 locates the second stripe unit of logical stripe 2 by accessing the disk identified in the next tuple [4:22] of the 3-tuple set ([0:23], [4:22], [1:22]) and the partition of that disk identified in that same second tuple [4:22] of the 3-tuple set ([0:23], [4:22], [1:22]). In this case, the disk identified in this second tuple [4:22] is "4", i.e., PDisk 4, and the partition of that disk identified in this second tuple [4:22] is "22", i.e., Partition 22. The array controller determines which of the plurality of stripe units of partition 22 to read as the second stripe unit of logical stripe 2 in this embodiment again based on the second number "0" of the retrieved one tuple of the stripe lookup table [103:0]. Accordingly, since "0" would also indicate first here, the array controller reads the first physical stripe unit of partition 22 of PDisk 4 (labeled, "2.2" in FIG. 12) as being the second stripe unit of logical stripe 2.

Logical Stripe 6 Example:

As another example, in one application, the array controller 1220 receives a request (e.g., from a client 450) to read data located at logical stripe 6. The array controller 1220 accesses the stripe lookup table 1226 stored in a memory (e.g., in or coupled to the array controller 1220) and locates the entry for logical stripe 6. The array controller retrieves the corresponding one tuple, which in this example is [103:1]. The array controller uses the first number "103" of the retrieved one tuple [103:1] in reading the partition group lookup table 1224 to locate and retrieve a corresponding G-element set, here, again, the 3-tuple set ([0:23], [4:22], [1:22]).

Based on the second number "1" of the retrieved one tuple of the stripe lookup table [103:1], the array controller locates the first stripe unit of logical stripe 6 by accessing the disk identified in the second tuple [4:22] of the 3-tuple set ([0:23], [4:22], [1:22]), and the partition of that disk identified in that second tuple [4:22]. The array controller decides to use the second tuple in the set by again computing the physical stripe number mod G. Accordingly, in this example, the controller computes the second number "1" (which is the physical stripe number) mod 3 (which is G in FIG. 12) to obtain 1, indicating second.

In this case, the disk identified in the second tuple [4:22] is "4", i.e., PDisk 4, and the partition of that disk identified in the second tuple [4:22] is "22", i.e., Partition 22. The array controller determines which of the plurality of stripe units of partition 22 to read as the first stripe unit of logical stripe 6 in this embodiment again based on the second number of the retrieved one tuple of the stripe lookup table. In this case, the second number of the retrieved one tuple [103:1] is "1". Therefore, the array controller reads the second physical stripe unit (labeled "6.1" in FIG. 12) of partition 22 of PDisk 4 as being the first stripe unit of logical stripe 6 (since "1" would also indicate second here).

The array controller 1220 locates the second stripe unit of logical stripe 6 by accessing the disk identified in the next tuple [1:22] of the 3-tuple tuple set ([0:23], [4:22], [1:22]) and the partition of that disk identified in that same next tuple [1:22] of the 3-tuple set ([0:23], [4:22], [1:22]). In this case, the disk identified in the next tuple [1:22] is "1", i.e., PDisk 1, and the partition of that disk identified in that next tuple [1:22] is "22", i.e., Partition 22. The array controller determines which of the plurality of stripe units of partition 22 to read as the second stripe unit of logical stripe 6 again based on the second number "1" of the retrieved one tuple [103:1]. Accordingly, the array controller reads the second physical stripe unit, "6.2", of partition 22 of PDisk 1 as being the second stripe unit of logical stripe 6.

The array controller 1220 locates the third stripe unit of logical stripe 6 by accessing the disk identified in the next tuple [0:23] of the set ([0:23], [4:22], [1:22]) and the partition of that disk identified in that same next tuple [0:23]. In this case, the disk identified in the tuple [0:23] is "0", i.e., PDisk 0, and the partition of that disk identified in the tuple [0:23] is "23", i.e., Partition 23. The array controller determines which of the plurality of stripe units of partition 23 to read as the third stripe unit of logical stripe 6 in this embodiment again based on the second number "1" of the retrieved one tuple [103:1]. Accordingly, the array controller reads the second physical stripe unit, "6.3", of partition 23 of PDisk 0 as being the third stripe unit of logical stripe 6.

Logical Stripe 12 Example:

As another example, in one application, the array controller 1220 receives a request (e.g., from a client 450) to read data located at logical stripe 12. The array controller 1220 accesses the stripe lookup table 1226 stored in a memory (e.g., in or coupled to the array controller 1220) and locates the entry for logical stripe 12. The array controller retrieves the corresponding one tuple, which in this example is [103:3]. The array controller uses the first number "103" of the retrieved one tuple [103:3] in reading the partition group lookup table 1224 to locate and retrieve a corresponding G-element set, here the 3-tuple set ([0:23], [4:22], [1:22]).

Based on the second number "3" of the retrieved one tuple [103:3], the array controller locates the first stripe unit of logical stripe 12 by accessing the disk identified in the first tuple [0:23] of the 3-tuple set ([0:23], [4:22], [1:22]), and the partition of that disk identified in the first tuple [0:23] of the 3-tuple set ([0:23], [4:22], [1:22]). The array controller decides to use the first tuple by computing the physical stripe number mod G. Accordingly, in this example, the controller computes the second number "3"(which is the physical stripe number) mod 3 (which is G in FIG. 12) to obtain 0, indicating first.

In this case, the disk identified in the first tuple [0:23] is "0", i.e., PDisk 0, and the partition of that disk identified in that first tuple [0:23] is "23", i.e., Partition 23. The array controller determines which of the plurality of stripe units of partition 23 to read as the first stripe unit of logical stripe 12 also based on the second number of the retrieved one tuple of the stripe lookup table. In this case, the second number of the retrieved one tuple [103:0] is "3". Therefore, the array controller reads the fourth physical stripe unit, "12.1", of partition 23 of PDisk 0 as being the first stripe unit of logical stripe 12 (since "3" would indicate fourth here).

The array controller 1220 locates the second stripe unit of logical stripe 12 by accessing the disk identified in the next tuple [4:22] of the 3-tuple set ([0:23], [4:22], [1:22]) and the partition of that disk identified in that same second tuple [4:22]. In this case, the disk identified in the second tuple [4:22] is "4", i.e., PDisk 4, and the partition of that disk identified in the second tuple [4:22] is "22", i.e., Partition 22. The array controller determines which of the plurality of stripe units of partition 22 to read as the second stripe unit of logical stripe 12 in this embodiment again based on the second number "3" of the retrieved one tuple [103:0] of the stripe lookup table. Accordingly, the array controller reads the fourth physical stripe unit, "12.2", of PDisk 4 as being the second stripe unit of logical stripe 12.

Accordingly, the 1-element set (the one tuple or "1 tuple") described with reference to FIG. 12 refers to a physical stripe within a certain partition group, rather than stripe units within each partition. Since a 1-element set is used rather than a G-element set, the size of the stripe lookup table 1226 is smaller than it might otherwise be. From this perspective, embodiments of this disclosure may be understood as a hybrid between a table-driven and an algorithmic data layout. For example, in one embodiment, a partition includes N stripe units $\{S1, S2, S3, \ldots, S_N\}$. Physical stripes within a partition group in this example are formed so that S1 of all the G partitions of the partition group are combined to form physical stripe 1, S2 of all the G partitions of the partition group combine to form physical stripe 2, etc. Accordingly, stripe units located at identical offsets on different storage devices of the partition group are grouped into the same physical stripe. Amongst the physical stripes of a partition group, the parity stripe unit of each physical stripe may be rotated algorithmically according to their relative position in the partition group. In such embodiments, placement of stripe units belonging to a physical stripe are implicit and may be viewed from a certain perspective as algorithmic since it is not particularly specified in a table.

In practice, the array controller's reading of a parity declustered storage array based on a multi-level lookup table as described above provides for faster reading and writing data in a parity declustered disk array than may be anticipated. This is because lookup tables provide a savings in terms of processing time, since retrieving a value from memory is often faster than undergoing a complex computation or complex input/output operation, such as those that incurred for parity declustered disk arrays based on algorithm data layouts.

Explained from another perspective, to locate the storage address of a particular block of data in the address space of a declustered RAID array using a multi-level lookup table according to some embodiments of this disclosure, an array controller (e.g., 720) may perform an exemplary method such as the following. (A) The array controller may compute a stripe number X by dividing a received virtual logical block address (VLBA) by a size of a stripe in an exemplary redundant disk array (i.e., compute stripe number X=VLBA/ (G*StripeUnitSize). The size of a stripe unit (StripeUnitSize) may be, for example, 1 bit, 1 byte, or as large an entire disk, depending on the embodiment. In practice, typically, the StripeUnitSize, is in the range of dozens of kilobytes to a few megabytes (e.g., 16 KB to 2 MB, for example). (B) The array controller may identify a stripe unit number Y by dividing the VLBA modulo the size of the stripe by a size of a stripe unit in the redundant disk array (i.e., stripe unit Y=(VLBA mod G*StripeUnitSize)/StripeUnitSize). (C) The array controller may compute a stripe unit offset Z by computing the VLBA modulo the size of the stripe modulo the size of the stripe unit (i.e., stripe unit offset Z=(VLBA mod G*StripeUnitSize) mod StripeUnitSize). (D) The array controller may retrieve from a stripe lookup table (e.g., 1226) a tuple associated the computed stripe number X, the tuple identifying a partition group number (PG#) and a physical stripe number (PS#). (E) The array controller may retrieve from the partition group lookup table (e.g., 1224) a set of tuples associated with the retrieved PG#, each tuple identifying a disk number (Pdisk#) of a disk in the array and a partition number (Partition#). (F) The array controller may select a tuple of the set retrieved in (E) based on the physical stripe number (PS#) identified in (D). The array controller may identify the physical location of the data as being on the disk in the array associated with the disk number (Pdisk#) identified in (E), at a sector offset determined by stripe unit offset Z plus the product of the physical stripe number and the size of the stripe unit plus the product of the partition number and a size of a partition in the redundant disk array (i.e., sector offset=Z+ (PS#*StripeUnitSize)+(Partition#*PartitionSize). This method performed by the array controller of certain embodiments identifies, based on a virtual logical block address (VLBA), a physical location of data in a redundant disk array, using a multi-level lookup table comprising a partition group lookup table and a stripe lookup table.

Memory Size Example:

To compare memory usage between a multi-level lookup table such as detailed above and a single-level stripe map directly mapping logical stripe units to physical disk stripe units, this disclosure provides the following example. In this example, a disk array has 48 disks (i.e., C=48), with each disk having a capacity of 1 TiB (1 tebibyte=$2^{40}$ bytes). Accordingly, the total storage capacity size of this array is 48 TiB. In this example, the parity stripe used consists of 11 stripe units (i.e., G=11), such as a parity stripes having 8 data units and 3 parity units (sometimes referred as erasure code=8+3P). Each stripe unit, data or parity, has a size of 128 KiB (KiB=$2^{10}$ bytes=1024 bytes). The size of the stripe is 1024 KiB, excluding parity. The physical stripe size is G* the stripe unit size, i.e., 11*128 KiB, which is 1408 KiB. The number of stripes in the array is the total capacity of the array divided by the physical stripe size (i.e., 48 TiB/1408 KiB) which is $3.7\times10^7$ stripes.

A single-level stripe map directly mapping logical stripe units to physical disk stripe units (e.g., the single-level stripe map 200 shown in FIG. 2) of this example arrangement would consume the following amount of memory. The number of stripe units per disk is equal to the capacity of each disk divided by the stripe unit size, which in this example is 1 TiB/128 KiB, or $8.4\times10^6$. Each tuple in the single-level stripe map 200 uses G times the size of each element [Physical Disk:Physical Stripe] of the tuple. Each element [Physical Disk:Physical Stripe] uses approximately 4 bytes since the number of bits used to represent a disk index of up to 48 disks within a disk array is 6 bits, and the number of bits used to represent a stripe unit index (up to $8.4\times10^6$) within a disk is 23 bits. In other words, in this example, to represent each [Physical Disk:Physical Stripe] in the tuple, 6+23=29 bits≈4 bytes, is used. Since storing [Physical Disk:Physical Stripe] uses 4 bytes, each tuple uses G×4 bytes, which in this example is 11×4 bytes, which is 44 bytes. The single-level stripe map has an entry for each logical stripe, so the single-level stripe map consumes a memory size equal to the number of entries ($3.7\times10^7$) times the size of each tuple (44 bytes), which is approximately $1.6\times10^9$ bytes≈1536 MiB≈1.5 GiB (where 1 MiB=$2^{20}$ bytes and 1 GiB=$2^{30}$ bytes). Therefore, a single-level stripe map (e.g., the single-level stripe map 200) directly mapping logical stripe units to physical disk stripe units for this example arrangement would consume 1.5 GiB.

A multi-level lookup table (e.g., 422) in accordance with embodiments of this disclosure has a stripe lookup table (e.g., 1226) and a partition group lookup table (e.g., 1224). Considering first the stripe lookup table, each 1-element set in the stripe lookup table has only 1 tuple, and therefore uses memory the size of each tuple [PG#:PS#]. Each tuple [PG#:PS#] uses approximately 4 bytes since the number of bits used to represent a partition group index of up to 65535 within the disk array is 16 bits, and the number of bits used to represent a stripe unit index (up to 1024 indices) within a partition group is 10 bits. Accordingly, to represent each [PG#:PS#] which is a two-element tuple, 16+10=26 bits≈4 bytes, are used. The stripe lookup table has an entry for each logical stripe, so the stripe lookup table uses a memory size equal to the number of entries ($3.7\times10^7$) times the size of each one tuple (4 bytes), which is $1.5\times10^8$ bytes≈140 MiB.

Now considering the partition group lookup table, the number of partitions per disk is equal to the capacity of each disk divided by the partition size, which in this example is 1 TiB/128 MiB, or 8192. (The partition size is the number of stripe units per partition times the size of a stripe unit, which in this example is 1024*128 KiB, or 128 MiB.) Each tuple in the partition group lookup table uses G times the size of each tuple [Pdisk#:Partition#] of the G-tuple set. Each tuple [Pdisk#:Partition#] uses approximately 3 bytes since the number of bits used to represent a disk index of up to 48 disks within a disk array is 6 bits, and the number of bits used to represent a partition index (up to 8192) within a disk is 13 bits. Accordingly, to represent each [Pdisk#:Partition#], 6+13=19 bits≈3 bytes, are used. Since storing [Pdisk#:Partition#] uses 3 bytes, each G-tuple set uses G×3 bytes, which in this example is 11×3 bytes, which is 33 bytes. The partition group lookup table has an entry for each partition group. The number of partition groups is equal to the total capacity of the array divided by the partition group size, or in this example, 48 TiB/1408 MiB, which is approximately $3.6\times10^4$. Accordingly, the partition group lookup table uses a memory size equal to the number of entries ($3.6\times10^4$) times the size of each G-tuple set (33 bytes), which is $1.4\times10^6$ bytes≈1 MiB.

Therefore, multi-level lookup table (e.g., 422) in accordance with embodiments of this disclosure applied to this example arrangement would use approximately 140 MiB+1 MiB which is 141 MiB. This is an order of magnitude less than that used by the single-level stripe map (approximately 1.5 GiB). In practice, actual memory savings compared to a single-level stripe map depends on factors such as the erasure code width and the partition size.

Figure 13:
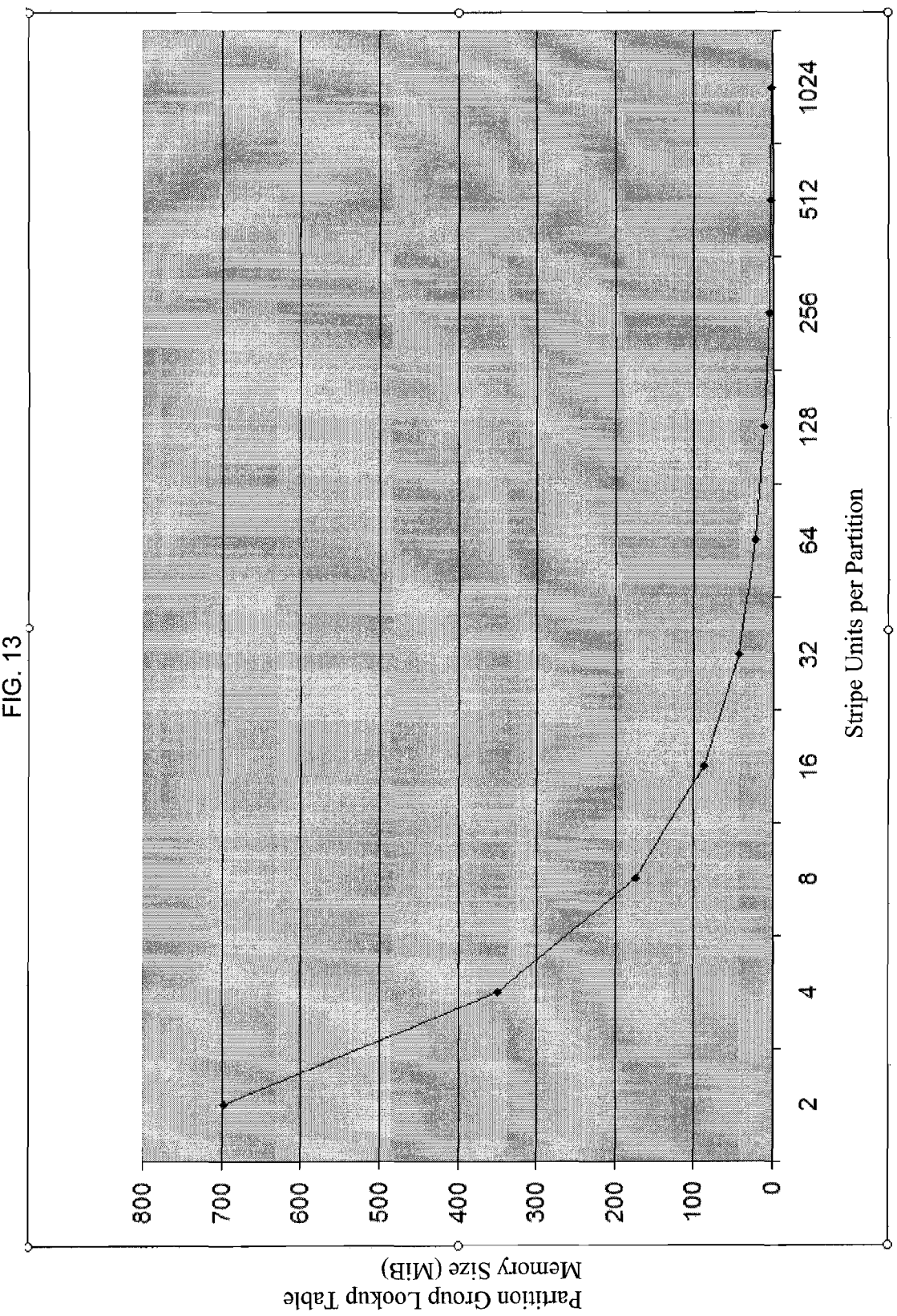
FIG. 13 is a graph of the memory size of a partition group lookup table with respect to the number of stripe units per partition, for an exemplary disk array having 48 disks, with each disk having a capacity of 1 terabyte.

In embodiments of this disclosure, memory space savings is proportional to the number of stripe units in a partition. FIG. 13 is a graph of the memory size of a partition group lookup table with respect to the number of stripe unites per partition for this example disk array having 48 disks, with each disk having a capacity of 1 TiB. As seen in FIG. 13, given the current example arrangement but varying the stripe units per partition, memory savings begin with 2 stripe units per partition and increases as the number of stripe units per partition increases. For example, with 2 stripe units per partition rather than 1024 stripe units per partition, the corresponding partition group lookup table uses approximately 700 MiB rather than 1 MiB.

Figure 14:
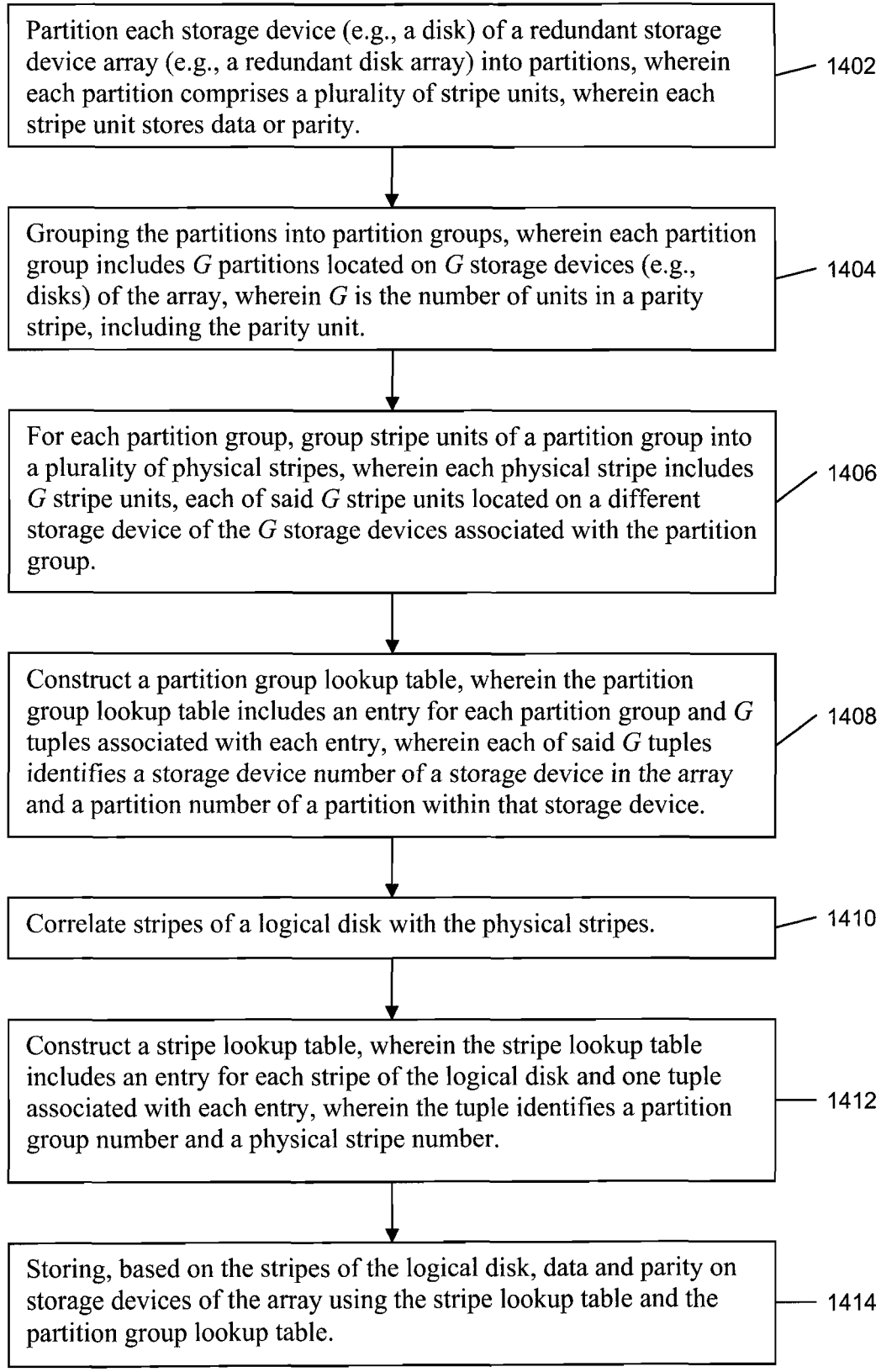
FIG. 14 is a flow chart showing a method in accordance with embodiments of this disclosure.

FIG. 14 is a flow chart showing a method 1400 in accordance with embodiments of this disclosure. In certain embodiments, the array controller (e.g., 420, 520, 620 or 720), the host machine (e.g., 430 530, 630, or 730), or a combination of both performs the method 1400. In certain embodiments, a client (e.g., 450) initiates a request to perform the method 1400. At 1402, each storage device (e.g., a disk) of a redundant storage device array (e.g., a redundant disk array) is partitioned into partitions. Each partition includes a plurality of stripe units. Each stripe unit stores data or parity. At 1404, the partitions are grouped into partition groups. Each partition group includes G partitions located on G storage devices (e.g., disks) of the array. Accordingly, in such an embodiment, each partition of a partition group is located on a different storage device. At 1406, for each partition group, stripe units of the partition group are grouped into a plurality of physical stripes. Each physical stripe includes G stripe units. Each of the G stripe units is located on a different storage device of the G storage devices associated with that partition group. In one embodiment, each of the G stripe units is located at identical offsets on the different storage devices of the G storage devices associated with that partition group. At 1408, a partition group lookup table (e.g., the partition group table 1224) is constructed. The partition group lookup table includes an entry for each partition group and G tuples associated with each entry. Each of the G tuples identifies a storage device number of a storage device (e.g., PDisk0) in the array (e.g., the disk array 1210) and a partition number of a partition within that storage device. At 1410, stripes of a logical disk are correlated with (or mapped to) the physical stripes. At 1412, a stripe lookup table (e.g., the stripe lookup table 1226) is constructed. The stripe lookup table includes an entry for each stripe of the logical disk and one tuple associated with each entry. The one tuple identifies a partition group number and a physical stripe number indicating a physical stripe within the partition group indicated by that partition group number. At 1414, based on the stripes of the logical disk, data and parity are stored on storage devices of the array using the stripe lookup table and the partition group lookup table.

Embodiments of this disclosure that include a multi-level lookup data structure (e.g., the multi-level lookup table 1222) provide support for shadowing. For example, the array controller 1220 may write data corresponding to a logical stripe to any location, and update the stripe lookup table 1226 in the multi-level lookup table 1222 to reflect that location. In another example, a list of free physical stripes may be stored in memory. In this example, the list may not be stored as part of metadata whereas the partition group table and stripe lookup table may be stored explicitly as metadata. During a disk failure recovery, the list of free physical stripes may be regenerated using the partition group table and stripe lookup table, with physical stripes not identified by a logical stripe in the stripe lookup table being deemed free.

Other embodiments of this disclosure include a log device (e.g., the log 528). In such embodiments, the disk array is partitioned into groups, each partition group having G partitions located on different disks of the array, a partition group lookup table is implemented, and a log device (e.g., the log 528) is included in addition to or instead of a stripe lookup table. In exemplary embodiments, the array controller (e.g., 520 or 720) and/or the host machine (e.g., 230 or 730) use the log device (e.g., 528) to atomically update contents of a logical stripe, e.g., by overwriting an underlying physical stripe, as opposed to shadowing the logical stripe contents on a different physical stripe.

In the embodiment shown in FIG. 5, the array controller 520 includes the partition group lookup table 424, the stripe lookup table 426, and a log 528. By inclusion of the log 528, the array controller may intercept an I/O coming from the host machine 530 or client 450 and create a sequential log file so that READs from and WRITEs to devices in the storage device array 410 are sequential. For example, when a WRITE request is received, in such an embodiment, rather than write over the older data stored at a previously recorded location, the array controller may write to a next available location and indicate in the log 528 the new location of the data. From one perspective, the array controller is "relocating" the data to the next available location rather than replacing the old data at the old location with the new data. For some operations, writing data to the next available location and reading data from a more recently accessed location may be beneficial, e.g., to avoid potentially costly seeks if the storage device is magnetic media. In another embodiment, the array controller may use the log device to perform atomic updates of data and parity associated with a logical stripe to a physical stripe storing existing data and parity associated with said logical stripe. For example, if a subset of the data for a logical stripe, such as only one data unit, has updated data, the array controller may be configured to write to the log the updated data and an updated parity for that logical stripe unit. The array controller may then write the updated data to the stripe unit on the physical stripe currently stored the existing data, which is now outdated, and write the updated parity to the corresponding parity unit location. If an error occurs during the write to physical stripe units, e.g., due to a power failure, when array controller comes back online, it can read from the log device the updated data and parity and write to the physical stripe that updated data and parity. For some operations, having the capability of writing anywhere may be more beneficial, e.g., if all or a significant number of stripe units of a particular logical stripe is being updated. In a storage system including an array controller such as the array controller 520 coupled to a storage device array such as the array 410, the array controller may be configured to use either the stripe lookup table 426 or the log 528 depending on the operation, e.g., by having instructions on selecting which mechanism to use for a particular operation.

In the embodiment show in FIG. 6, the array controller 620 includes a partition group lookup table 424 and a log 528, but not a stripe lookup table. Such a system may be applied in environments that do not shadow stripes. In such embodiments, a partition group lookup table (e.g., 424) is used in implementing parity declustering, but rather than implementing a stripe lookup table, a log (e.g., 528) is used to atomically change the stripe contents.

CONCLUSION

Accordingly, a parity declustered storage device array, such as a parity declustered redundant disk array, with partition groups is disclosed. As will be appreciated by one skilled in the art, while the figures may shown embodiments with a particular number of storage devices or disks, a particular number of partitions, partition groups, stripe units per partition group, stripe units per storage device, etc, it will be understood that embodiments of this disclosure may have fewer or more as may be appropriate for a particular implementation of this disclosure. Additionally, while many of the exemplary embodiments above are described with reference to disks, storage devices in accordance with embodiments of this disclosure may be memories, tapes or disks, video tape, optical, DVD, magnetic tape, bubble memory devices, or any of a variety of now known or future known storage devices that may form an array capable of implement parity declustering.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 15:
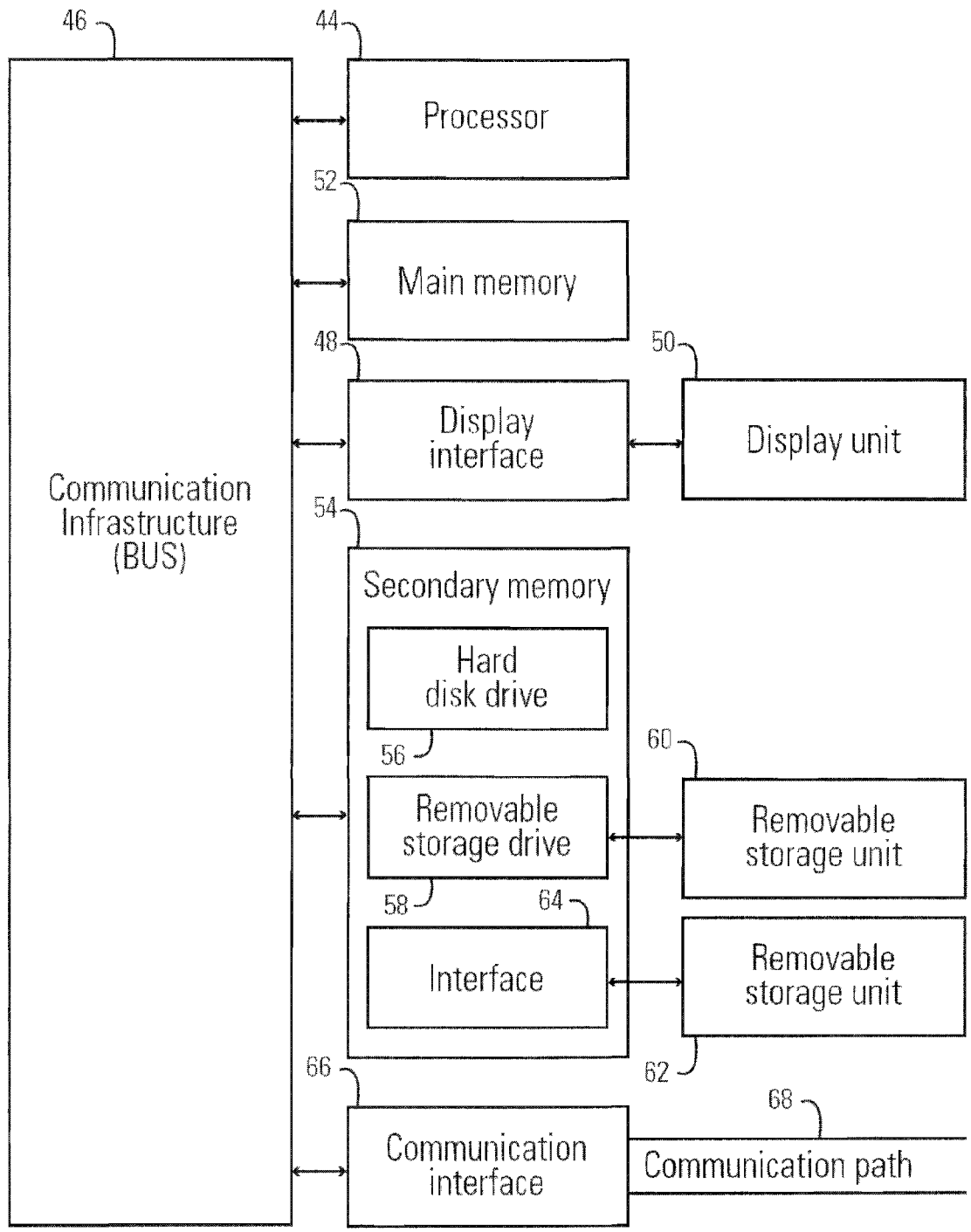
FIG. 15 is a high level block diagram showing an information processing system useful for implementing embodiments of this disclosure.

FIG. 15 is a high level block diagram showing an information processing system useful for implementing embodiments of this disclosure. The processing system may be or be part of a host machine 430 or 530, for example. The computer system includes one or more processors, such as processor 44. The processor 44 is connected to a communication infrastructure 46 (e.g., a communications bus, cross-over bar, or network). Various embodiments are described in terms of this exemplary computer system. After reading this description, it will become apparent to a person of ordinary skill in the relevant art(s) how to implement embodiments of this disclosure using other computer systems and/or computer architectures.

The computer system can include a display interface 48 that forwards graphics, text, and other data from the communication infrastructure 46 (or from a frame buffer not shown) for display on a display unit 50. The computer system also includes a main memory 52, preferably random access memory (RAM), and may also include a secondary memory 54. The secondary memory 54 may include, for example, a hard disk drive 56 and/or a removable storage drive 58, representing, for example, a floppy disk drive, a magnetic tape drive, or an optical disk drive. The removable storage drive 58 reads from and/or writes to a removable storage unit 60 in a manner well known to those having ordinary skill in the art. Removable storage unit 60 represents, for example, a floppy disk, a compact disc, a magnetic tape, or an optical disk, etc. which is read by and written to by removable storage drive 58. As will be appreciated, the removable storage unit 60 includes a computer readable medium having stored therein computer software and/or data.

In alternative embodiments, the secondary memory 54 may include other similar means for allowing computer programs or other instructions to be loaded into the computer system. Such means may include, for example, a removable storage unit 62 and an interface 64. Examples of such means may include a program cartridge and cartridge interface (such as that found in video game devices), a removable memory chip (such as an EPROM, or PROM) and associated socket, and other removable storage units 62 and interfaces 64 which allow software and data to be transferred from the removable storage unit 62 to the computer system.

The computer system may also include a communications interface 66. Communications interface 66 allows software and data to be transferred between the computer system and external devices. Examples of communications interface 66 may include a modem, a network interface (such as an Ethernet card), a communications port, or a PCMCIA slot and card, etc. Software and data transferred via communications interface 66 are in the form of signals which may be, for example, electronic, electromagnetic, optical, or other signals capable of being received by communications interface 66. These signals are provided to communications interface 66 via a communications path (i.e., channel) 68. This channel 68 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 52 and secondary memory 54, removable storage drive 58, and a hard disk installed in hard disk drive 56.

Computer programs (also called computer control logic) are stored in main memory 52 and/or secondary memory 54. Computer programs may also be received via communications interface 66. Such computer programs, when executed, enable the computer system to perform the features of the present disclosure as discussed herein. In particular, the computer programs, when executed, enable the processor 44 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, references to "a method" or "an embodiment" throughout are not intended to mean the same method or same embodiment, unless the context clearly indicates otherwise. Additionally, features of embodiments are not mutually exclusive, unless the context clearly indicates otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of this disclosure. The embodiment was chosen and described in order to best explain the principles of this disclosure and the practical application, and to enable others of ordinary skill in the art to understand this disclosure for various embodiments with various modifications as are suited to the particular use contemplated.

Having thus described the invention of the present application in detail and by reference to embodiments thereof, it will be apparent that modifications and variations are possible without departing from the scope of this disclosure defined in the appended claims.

What is claimed is:

1. A storage system comprising:
    an array of storage devices, wherein each storage device comprises a plurality of stripe units; and
    a physical array controller coupled to the array of storage devices, wherein the array controller comprises a multi-level lookup table, the array controller configured to store and retrieve data and parity in the storage devices based on a data layout defined by the multi-level lookup table;
    wherein each physical stripe comprises a plurality of data units and at least one parity unit forming a redundant array of independent disks (RAID) data storage stripe of size G stripe units;
    wherein the multi-level lookup table comprises information correlating logical block addresses with physical stripe addresses for RAID reconstruction of stored data in memory referenced by the logical block addresses; and
    wherein a number of storage devices C, to decluster RAID stripe size from physical array size, is less than a number of partition groups G.

2. The storage system of claim 1, wherein each storage device has a storage capacity of at least 1 terabyte.

3. The storage system of claim 1, wherein the multi-level lookup table has a size in an order of magnitude of megabytes.

4. The storage system of claim 1, wherein each storage device comprises partitions, and each partition comprises at least one thousand stripe units.

5. The storage system of claim 4, wherein partitions from different storage devices form a partition group, and wherein each partition group is divided into physical stripes, wherein the physical stripes correlate to stripes of a logical disk.

6. The storage system of claim 5, wherein the multi-level lookup table comprises: a partition group lookup table comprising an entry for each partition group and G tuples associated with each entry, wherein each of said G tuples identifies a storage device number of a storage device in the array and a partition number of a partition within said storage device; and a stripe lookup table comprising an entry for each stripe of the logical disk and one tuple associated with each entry, wherein the one tuple identifies a partition group number and a physical stripe number.

7. The storage system of claim 1, wherein the array controller further comprises a log device.

8. A storage system comprising:
    an array of storage devices, wherein each storage device is divided into a plurality of partitions, wherein each partition comprises a plurality of stripe units; and
    a physical array controller coupled to the array of storage devices, wherein the array controller comprises a multi-level lookup table, the array controller configured to store and retrieve data and parity in the storage devices based on the multi-level lookup table;
    wherein each stripe unit comprises a plurality of data units and at least one parity unit forming a redundant array of independent disks (RAID) data storage stripe of size G data units;
    wherein the multi-level lookup table comprises information correlating logical block addresses with physical stripe addresses for RAID reconstruction of stored data in memory referenced by the logical block addresses; and
    wherein a number of storage devices C, to decluster RAID stripe size from physical array size, is less than a number of partition groups G.

9. The storage system of claim 8, wherein the storage system further comprises: a log device located within the array controller, wherein the array controller is configured to use the log device to perform atomic updates of data and parity associated with a logical stripe to a physical stripe storing existing data and parity associated with said logical stripe.

10. The storage system of claim 9, wherein the storage system further comprises: a stripe lookup table located within the array controller, the stripe lookup table comprising an entry for each stripe of a logical disk and one tuple associated with each entry, wherein the one tuple identifies a partition group number and a physical stripe number.

11. A multi-level lookup data structure identifying a physical location of data stored in a disk array, the multi-level lookup data structure comprising:
   a partition group lookup table located within an array controller coupled to a parity declustered redundant disk array, the partition group lookup table comprising an entry for each partition group of the disk array and G tuples associated with each entry, wherein each of said G tuples identifies a disk number of a disk in the disk array and a partition number of a partition within said disk; and
   a stripe lookup table located within the array controller, the stripe lookup table comprising an entry for each stripe of a logical disk and one tuple associated with each entry, wherein the one tuple identifies a partition group number and a physical stripe number;
   wherein each physical stripe comprises a plurality of data units and at least one parity unit forming a redundant array of independent disks (RAID) data storage stripe of size G stripe units;
   wherein the partition group lookup table and the stripe lookup table comprise information correlating logical block addresses with physical stripe addresses for RAID reconstruction of stored data in memory referenced by the logical block addresses; and
   wherein a number of storage devices C, to decluster RAID stripe size from physical array size, is less than a number of partition groups G.

12. The multi-level lookup data structure of claim 11, wherein a memory size of the partition group lookup table is smaller than a memory size of the stripe lookup table.

13. The multi-level lookup data structure of claim 11, wherein the memory size of the partition group lookup table is at least one order of magnitude smaller than a memory size of the stripe lookup table.

14. The multi-level lookup data structure of claim 11, wherein the memory size of the partition group lookup table is at least two orders of magnitude smaller than a memory size of the stripe lookup table.

15. A method of storing data in a parity declustered redundant storage device, the method comprising:
   partitioning each storage device of a redundant storage device array into partitions, wherein each partition comprises a plurality of stripe units, wherein each stripe unit stores data or parity;
   grouping the partitions into partition groups, wherein each partition group comprises G partitions located on G storage devices of the array;
   for each partition group, grouping stripe units of a partition group into a plurality of physical stripes, wherein each physical stripe comprises G stripe units, each of said G stripe units located on a different storage device of the G storage devices associated with the partition group;
   constructing a partition group lookup table, wherein the partition group lookup table comprises an entry for each partition group and G tuples associated with each entry, wherein each of said G tuples identifies a storage device number of a storage device in the array and a partition number of a partition within said storage device;
   correlating stripes of a logical disk with the physical stripes; constructing a stripe lookup table, wherein the stripe lookup table comprises an entry for each stripe of the logical disk and one tuple associated with each entry, wherein the one tuple identifies a partition group number and a physical stripe number; and
   storing, based on the stripes of the logical disk, data and parity on storage devices of the array using the stripe lookup table and the partition group lookup table;
   wherein each physical stripe comprises a plurality of data units and at least one parity unit forming a redundant array of independent disks (RAID) data storage stripe of size G stripe units;
   wherein the partition group lookup table and the stripe lookup table comprise information correlating logical block addresses with physical stripe addresses for RAID reconstruction of stored data in memory referenced by the logical block addresses; and
   wherein a number of storage devices C, to decluster RAID stripe size from physical array size, is less than a number of partition groups G.

16. The method of claim 15, wherein grouping stripe units of a partition group into a plurality of physical stripes, wherein each physical stripe comprises G stripe units, each of said G stripe units located on a different storage device of the G storage devices associated with the partition group, comprises: grouping stripe units of a partition group into a plurality of physical stripes, wherein each physical stripe comprises G stripe units, each of said G stripe units located at identical offsets on a different storage device of the G storage devices associated with the partition group.

17. The method of claim 15, wherein partitioning each storage device of a redundant storage device array into partitions, wherein each partition comprises a plurality of stripe units, comprises: partitioning each storage device of a redundant storage device array into partitions, wherein each partition comprises at least 1000 stripe units.

18. The method of claim 15, wherein constructing a partition group lookup table comprises constructing a partition group lookup table having a memory size that is smaller than a memory size of the stripe lookup table.

19. The method of claim 18, wherein constructing a partition group lookup table having a memory size that is smaller than a memory size of the stripe lookup table comprises: constructing a partition group lookup table having a memory size that is at least one order of magnitude smaller than a memory size of the stripe lookup table.

20. The method of claim 15, wherein the storage device array is a disk array.

* * * * *